(12) United States Patent
Ohsawa

(10) Patent No.: US 6,477,332 B1
(45) Date of Patent: Nov. 5, 2002

(54) ELECTRONIC IMAGE DISPLAY APPARATUS AND CAMERA HAVING ELECTRONIC IMAGE DISPLAY FUNCTION

(75) Inventor: Toshifumi Ohsawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/473,498

(22) Filed: Dec. 28, 1999

(30) Foreign Application Priority Data

Dec. 28, 1998 (JP) .......................................... 10-372528

(51) Int. Cl.[7] .................... G03B 17/24; G03B 19/02; G03B 13/02; H04N 7/18; H04N 5/222
(52) U.S. Cl. .................... 396/319; 396/390; 396/310; 396/374; 348/64; 348/333.01; 348/333.02; 348/333.03
(58) Field of Search .................... 396/310, 311, 396/319, 374, 390; 348/64, 333.01, 333.02, 333.03, 333.05

(56) References Cited

U.S. PATENT DOCUMENTS

| | | | | |
|---|---|---|---|---|
| 5,652,643 A | * | 7/1997 | Saito et al. | 396/311 |
| 5,909,241 A | * | 6/1999 | Hibino et al. | 348/97 |
| 6,185,377 B1 | * | 2/2001 | Taka et al. | 396/284 |
| 2002/0028075 A1 | * | 3/2002 | Kazami et al. | 396/387 |

* cited by examiner

Primary Examiner—David M. Gray
Assistant Examiner—Melissa J Koval
(74) Attorney, Agent, or Firm—Robin, Blecker & Daley

(57) ABSTRACT

An electronic image display apparatus includes an image sensor arranged to obtain an electronic image, an external memory arranged to store electronic image information related to identification information which identifies a photographic film loaded in the apparatus, a reproducing circuit arranged to reproduce the identification information recorded at a magnetic information recording part of the photographic film loaded, and a display device arranged to display, on the basis of the identification information stored in the external memory and reproduction information reproduced by the reproducing circuit, the electronic image information related to the identification information. The electronic image display apparatus is thus arranged to let the user know, without fail, what picture is taken on which of films by displaying an electronic image recorded on each film, even in a case where there are many exposed or partially exposed films.

3 Claims, 17 Drawing Sheets

| 1 | YEAR/MONTH/DAY/HOUR/MINUTE |
|---|---|
| 2 | PRINT ASPECT |
| 3 | USE OR NONUSE OF FLASH |
| 4 | OBJECT LUMINANCE |
| 5 | OBJECT DISTANCE |
| 6 | POSITION OF MAIN OBJECT |
| 7 | NUMBER OF PRINTS |
| 8 | PHOTO-TAKING SHUTTER SPEED |
| 9 | PHOTO-TAKING APERTURE VALUE |
| 10 | FOCAL LENGTH |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

| ADDRESS | INFORMATION | ADDRESS | INFORMATION |
|---|---|---|---|
| A | PHOTO-TAKING INFORMATION OF PRESENT FILM | A + 1 | IMAGE DATA OF PRESENT FILM |
| A + 2 | PHOTO-TAKING INFORMATION OF FIRST FILM | A + 3 | IMAGE DATA OF FIRST FILM |
| A + 4 | PHOTO-TAKING INFORMATION OF SECOND FILM | A + 5 | IMAGE DATA OF SECOND FILM |
| A + 6 | PHOTO-TAKING INFORMATION OF THIRD FILM | A + 7 | IMAGE DATA OF THIRD FILM |
| A + 8 | PHOTO-TAKING INFORMATION OF FOURTH FILM | A + 9 | IMAGE DATA OF FOURTH FILM |
| A + 10 | PHOTO-TAKING INFORMATION OF FIFTH FILM | A + 11 | IMAGE DATA OF FIFTH FILM |
| A + 12 | PHOTO-TAKING INFORMATION OF SIXTH FILM | A + 13 | IMAGE DATA OF SIXTH FILM |
| A + 14 | PHOTO-TAKING INFORMATION OF SEVENTH FILM | A + 15 | IMAGE DATA OF SEVENTH FILM |
| A + 16 | PHOTO-TAKING INFORMATION OF EIGHTH FILM | A + 17 | IMAGE DATA OF EIGHTH FILM |
| A + 18 | PHOTO-TAKING INFORMATION OF NINTH FILM | A + 19 | IMAGE DATA OF NINTH FILM |
| A + 20 | PHOTO-TAKING INFORMATION OF TENTH FILM | A + 21 | IMAGE DATA OF TENTH FILM |

ELECTRONIC IMAGE DISPLAY APPARATUS AND CAMERA HAVING ELECTRONIC IMAGE DISPLAY FUNCTION

BACKGROUND OF THE INVENTION

1. Field of the Invention

The present invention relates to an electronic image display apparatus to be used together with a photographic film arranged to permit recording images thereon, and a camera having an electronic image display function.

2. Description of Related Art

A novel photographic system was developed during recent years. This system includes a magnetic recording part provided on a photographic film and a camera arranged to record in the magnetic recording part some information about photo-taking data, etc., in taking photographs. The information recorded is used for developing and printing the photographs. An art for use of such magnetic record of information has been disclosed, for example, in Japanese Laid-Open Patent Application No. HEI 4-172432, etc. According to the art, when a film which is rewound in a state of being used, i.e., exposed, only midway for photo-taking is reloaded on a camera (hereinafter referred to as a partially exposed film), the film can be automatically transported to the position of a leading unexposed frame among unexposed frames by using the recorded information.

Meanwhile, some of cameras of the kind using the film of the above-stated type have come to be provided, as disclosed in Japanese Laid-Open Patent Application No. HEI 7-319034, etc., with an image sensor and a monitor and arranged to permit an image photoelectrically converted by the image sensor to be displayed or recorded.

The camera having the above-stated function of automatically transporting the partially exposed film to the position of the leader of unexposed frames has an advantage over the conventional arrangement of manually loading a midway used (partially exposed) film in that it effectively prevents the film from having an exposed frame double exposed or wastefully transported by mistake.

However, if there are many partially exposed films, it becomes difficult to know what picture has been taken on which of the films. It is also difficult to know exactly what picture is taken on a partially exposed film when the film is left unused over a long period of time.

BRIEF SUMMARY OF THE INVENTION

It is an object of the invention to provide an electronic image display apparatus arranged to be capable of letting the user know what picture has been taken with which of films even in cases where there are many exposed or partially exposed films, and also to provide a camera using the electronic image display apparatus.

To attain the above object, in accordance with one aspect of the invention, there is provided an electronic image display apparatus, comprising image pickup means for obtaining an electronic image, storage means for storing (i) identification information for identifying a photographic film and (ii) electronic image information related to the identification, reproducing means for reproducing the identification information recorded at a magnetic information recording part of the photographic film loaded in the electronic image display apparatus, and image display means for displaying, on the basis of the identification information stored in the storage means and reproduction information reproduced by the reproducing means, the electronic image information related to the identification information, so that an electronic image corresponding to an image recorded on the photographic film is displayed.

The above and further objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 18 shows an example of a memory map according to each embodiment of the invention.

DETAILED DESCRIPTION OF THE INVENTION

Hereinafter, preferred embodiments of the invention will be described in detail with reference to the drawings.

First Embodiment

Figure 1A:
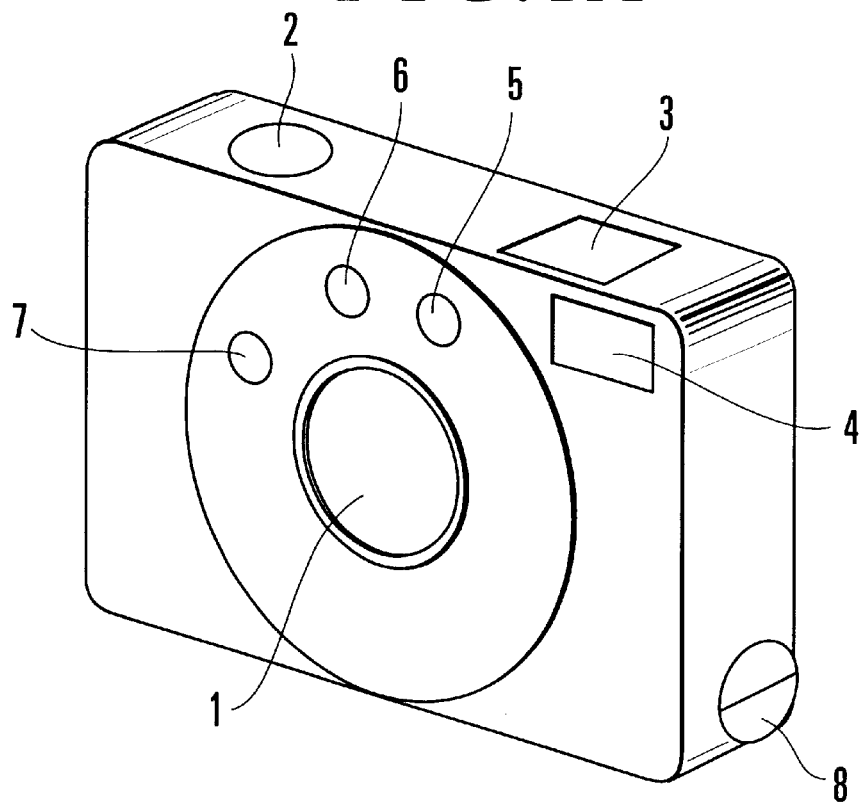
FIGS. 1A and 1B are perspective views showing the appearance of a camera according to each embodiment of the invention.
Figure 1B:
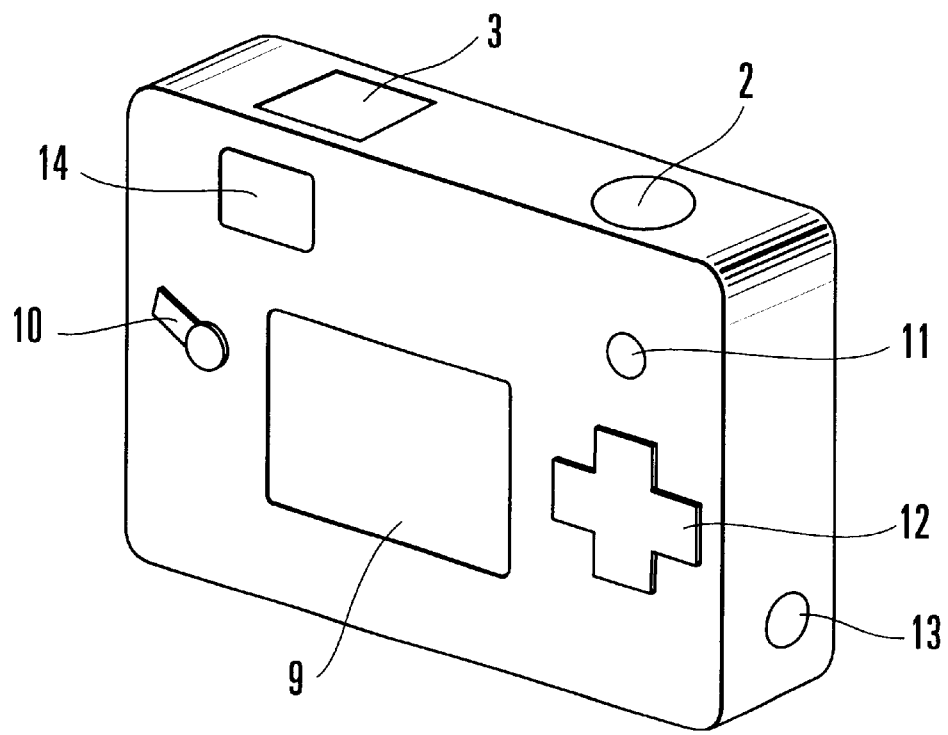

FIGS. 1A and 1B respectively show the appearance of a camera according to a first embodiment of the invention. FIG. 1A is a perspective view taken from the front side of the camera. FIG. 1B is a perspective view taken from the rear side of the camera.

In FIGS. 1A and 1B, there are illustrated a photo-taking lens 1, a shutter button 2, a display device 3 which is composed of, for example, a liquid crystal display panel, etc., and makes a film counter display, a warning display, etc., a flash light emitting part 4, an objective lens 5 of a viewfinder optical system, a light projecting part 6 of an AF light source arranged to project infrared light or the like onto a shooting object in focusing, a light receiving part 7 arranged to receive, from the object, reflection light obtained through the light projecting part 6, a knob 8 for opening and closing the lid of a film chamber (not shown) which is disposed on the lower side of the camera, a monitor 9 which is, for example, composed of a liquid crystal display panel, etc., and which displays a photo-taking image, etc., a selection switch 10 for selecting the use or nonuse of the monitor 9, a defining switch 11 arranged to make the data of photo-taking information definite as will be described in detail later, a cross switch 12 arranged for selecting the data of photo-taking information as will be described in detail later, a rewinding switch 13 for rewinding a film while the film is in a midway used (partially exposed) state, and an eyepiece part 14 of a viewfinder.

Figure 2:
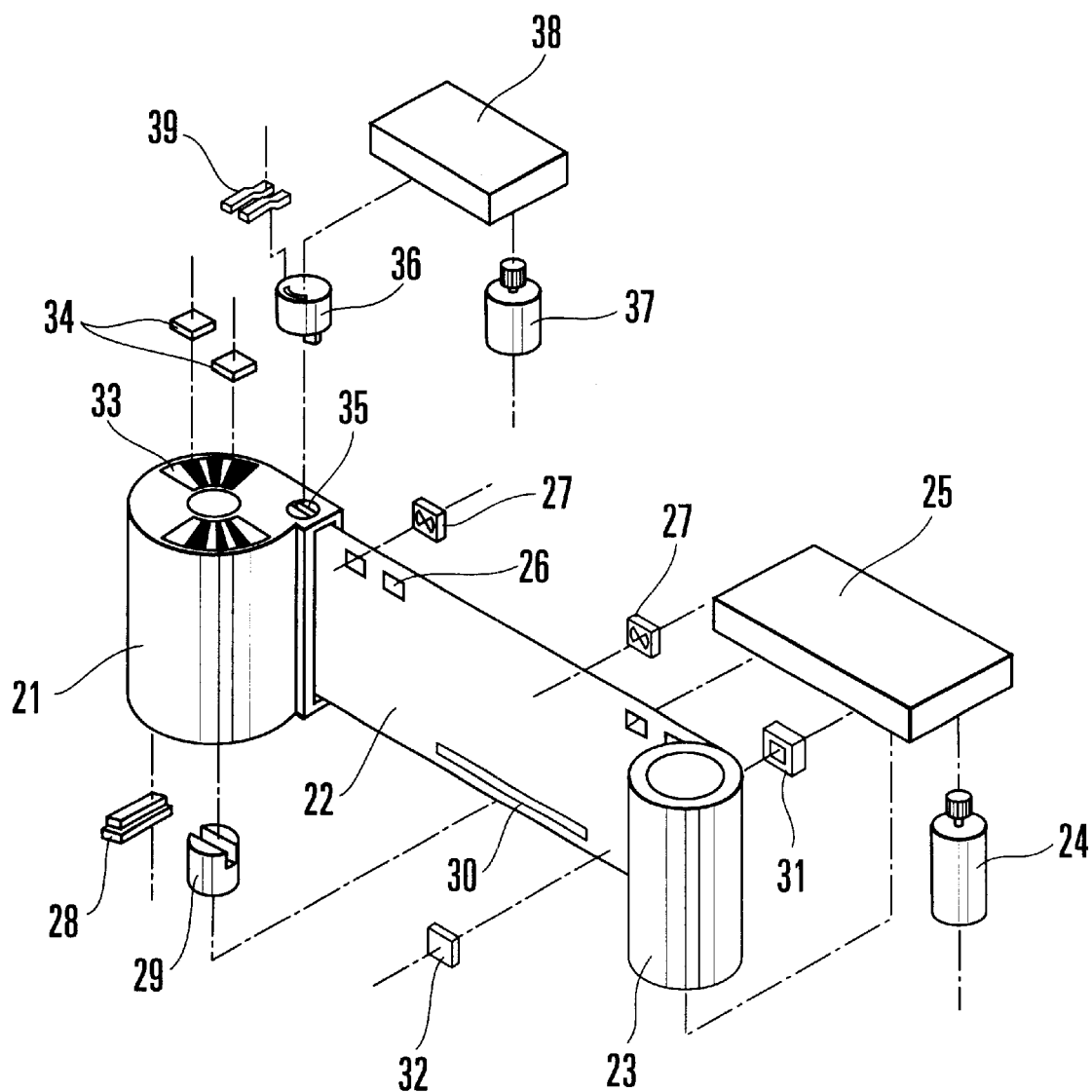
FIG. 2 is an exploded perspective view showing a film cartridge, a film and parts arranged around the film cartridge in the camera shown in FIG. 1.

FIG. 2 is an exploded perspective view showing a film cartridge, a film and parts arranged around the film cartridge inside of the camera.

More specifically, in FIG. 2, there are illustrated a film cartridge 21, a film 22, a film winding spool 23, a first motor 24 provided for winding and rewinding the film 22, a first gear train 25 connecting the first motor 24 to the winding spool 23, and perforations 26 provided in the film 22 for indexing a photo-taking image plane. A perforation detector 27 which is composed of a photo-reflector, etc., is arranged to detect the perforations 26. A cartridge detecting switch 28 is arranged to detect the presence or absence of the film cartridge 21. A fork 29 is provided for winding (feeding) or rewinding the film 22 by rotating the shaft of the film cartridge 21. The fork 29 is connected to the first gear train 25. A magnetic track 30 is provided on the film 22 for writing and reading photo-taking information into or out of the track by a magnetic head 31. A pad 32 is arranged to push the magnetic head 31 against the magnetic track 30 provided on the film 22.

An information indicating disk 33 has a black-and-white pattern recorded on a disk-shaped member and is arranged to permit reading and decoding a code pattern to enable the camera to have information on the kind or sensitivity of the film 22, the number of photo-taking frames, etc. The information indicating disk 33 can be arranged to indicate, by its stopped position, information on the using (exposure) state of the film 22, such as an unexposed state, a partially exposed state or a full exposed state, for example, as disclosed in Japanese Laid-Open Patent Application No. HEI 5-313233, etc. The information indicating disk 33 rotates together with the shaft of the film cartridge 21. A film information reading circuit 34 which is composed of a photo-reflector, etc., is arranged to read the code pattern of the information indicating disk 33. A closing-and-opening member 35 is provided for opening and closing the light-shielding door of the film exit port provided in the film cartridge 21. An opening-and-closing driving member 36 is arranged to drive the closing-and-opening member 35. A second motor 37 is provided for actuating the opening-and-closing driving member 36. A second gear train 38 connects the second motor 37 to the opening-and-closing member 36. A light-shielding door detecting switch 39 is arranged to detect the opening and closing of the light-shielding door.

Figure 3:
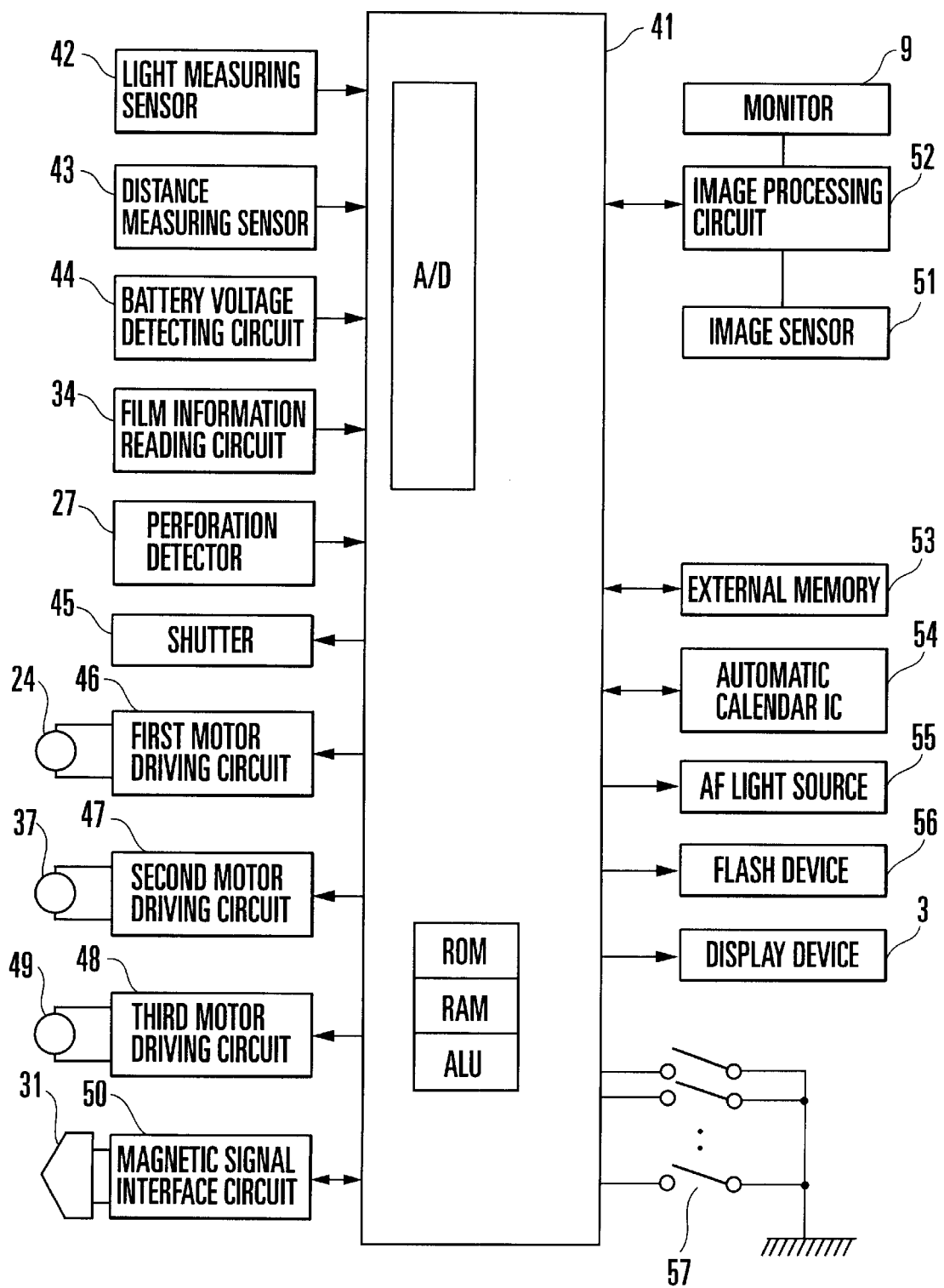
FIG. 3 is a block diagram showing by way of example the arrangement of electric circuits of the camera shown in FIG. 1.

FIG. 3 is a block diagram showing by way of example the arrangement of electric circuits of the above-stated camera. In FIG. 3, an LCD monitor 9 and a display device 3 are the same as corresponding parts shown in FIG. 1B. A first motor 24, a perforation detector 27, a magnetic head 31, a film information reading circuit 34 and a second motor 37 are the same as the corresponding parts shown in FIG. 2.

Referring to FIG. 3, a control circuit 41 is composed of a microcomputer or the like and has an ALU, a ROM, a RAM and an A/D converter disposed therein. The control circuit 41 is arranged to control the whole camera including its mechanisms, etc. The sequence of control actions to be executed by the control circuit 41 will be described in detail later. A light measuring sensor 42 is provided for obtaining information on the luminance of the object of shooting. The light measuring sensor 42 is composed of, for example, a photo-diode, an amplifier, etc., and is connected to the input terminal of the A/D converter of the control circuit 41. A distance measuring sensor 43 has a sensor part which is composed of a PSD or a CCD, for example, and a signal processing part which processes a signal coming from the sensor part. The distance measuring sensor 43 is also connected to the input terminal of the A/D converter of the control circuit 41. A battery voltage detecting circuit 44 is arranged to output information on the voltage of a battery employed as the power source of the camera and is connected to the input terminal of the A/D converter of the control circuit 41. The output of the perforation detector 27 and that of the film information reading circuit 34 are also connected to the input terminal of the A/D converter of the control circuit 41.

A shutter 45 is connected to the output terminal of the control circuit 41 to be controlled by the control circuit 41. A first motor driving circuit 46 is connected to the output terminal of the control circuit 41 and drives the first motor 24 under the control of the control circuit 41. A second motor driving circuit 47 is connected to the output terminal of the control circuit 41 and drives the second motor 37 under the control of the control circuit 41. A third motor driving circuit 48 is connected to the output terminal of the control circuit 41 and drives a third motor 49 under the control of the control circuit 41. The third motor 49 is arranged to drive a focusing lens (not shown) which is included in the photo-taking lens 1.

A magnetic signal interface circuit 50 is arranged to receive a signal from the control circuit 41 in recording information in the magnetic track 30 of the film 22. In response to the signal, the magnetic signal interface circuit 50 gives an optimum recording current to the magnetic head 31 according to the signal. In reproducing recorded information from the magnetic track 30 on the film 22, the magnetic signal interface circuit 50 amplifies a reproduced signal coming from the magnetic head 31 to a suitable degree and performs a filtering action, a waveform shaping action, etc., on the amplified reproduced signal as necessary. The reproduced signal thus processed is sent from the magnetic signal interface circuit 50 to the control circuit 41.

An image sensor 51 is provided for obtaining electronic image information on the image of an object of shooting and is composed of, for example, a two-dimensional area sensor such as a CCD or a CMOS. An image processing circuit 52 is arranged to control the image sensor 51, to perform a signal processing action, in accordance with a command from the control circuit 41, and to allow the monitor 9 to display an image. An external memory 53 is a nonvolatile memory which has a larger capacity than the RAM, etc., disposed inside of the control circuit 41. For example, a flash memory or the like is used as the external memory 53 for data transfer between the control circuit 41. An automatic calendar IC 54 is composed of a quartz crystal oscillator and an integrated circuit for clock and is arranged to automatically count time as calendar information on year, month, day, hour, minute or the like independently of the operation of the control circuit 41. The automatic calendar IC is connected to the control circuit 41 in such a way as to permit the control circuit 41 to read its time count information any time as desired. An AF light source 55 is arranged to project light such as infrared light onto the object in obtaining information about a distance from the distance measuring sensor 43 to the object of shooting. The light of the AF light source 55 is arranged to be emitted in response to a signal from the control circuit 41.

A flash device 56 is arranged to emit light in response to a signal from the control circuit 41 when the luminance of the object is insufficient. The display device 3 is arranged to light up each segment thereof under the control of a signal from the control circuit 41. Various switches 57 include the shutter button 2, the selection switch 10, the defining switch 11, the cross switch 12 and the rewinding switch 13 which are shown in FIGS. 1A and 1B and the cartridge detecting switch 28 and the light-shielding door opening-and-closing detecting switch 39 which are shown in FIG. 2.

Figures 4, 5:
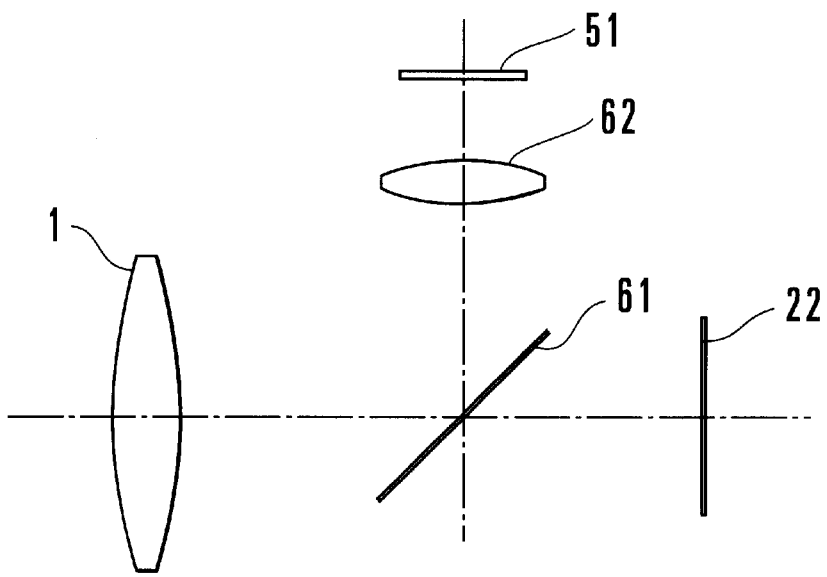
FIG. 4 is a schematic diagram showing the arrangement of a photo-taking optical system of the camera shown in FIG. 1.
FIG. 5 is a table showing the details of photo-taking information of the camera of each embodiment of the invention.

FIG. 4 schematically shows the photo-taking optical system of the camera.

Referring to FIG. 4, a light flux passing through the photo-taking lens 1 is split by a light flux splitting member 61 into a component which reaches the film 22 and a component which reaches the image sensor 51. Generally, an image size on the image sensor 51 differs from an image size on the film 22. Therefore, an optical system 62 is arranged to be used for image size conversion as necessary.

FIG. 5 is a table showing the contents of photo-taking information to be recorded in the magnetic track 30 for a shot taken on each of frames of the film 22.

Information composed of data of year, month, day, hour and minute is recorded according to the clock information of the automatic calendar IC 54. Information on a print aspect ratio is recorded as the aspect ratio of a standard print, a high-vision print, a panorama print or the like according to setting made by operating a print aspect ratio selection switch (not shown). Information on the use or nonuse of the flash device is recorded according to whether or not the flash device 56 is caused to emit light in taking a shot. Information on the luminance of the object obtained in taking a shot is recorded according to a signal outputted from the light measuring sensor 42. Information on the distance to the object is recorded according to a signal outputted from the distance measuring sensor 43.

Figures 6A, 6B:
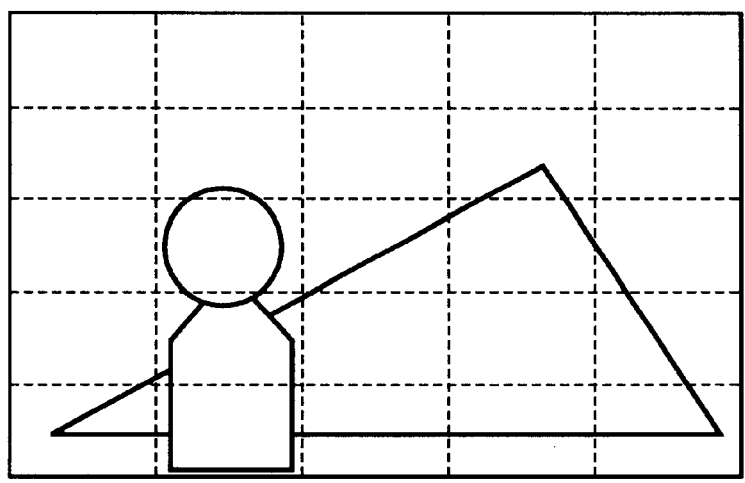
FIGS. 6A and 6B are diagrams for explaining information about the position of a main object in each embodiment of the invention.

For obtaining information on the position of a main object, the photo-taking image plane is divided into 25 areas as shown in FIG. 6A. Then, the information on the position of the main object is recorded to show at which of the divided areas the main object is located. In the case of FIG. 6B, for example, a picture of a person is taken with a mountain in the background. In this case, the face of the person is located at a divided area "12" in FIG. 6A. Then, the information on the position of the main object is recorded as "12". The manner in which such information is to be designated will be described later. Information on a required number of prints (copies) of each picture taken is recorded according to an input from an operation switch. Information on a photo-taking shutter speed is recorded as a shutter speed decided on the basis of the luminance of the object. Information on a photo-taking aperture value is recorded as an aperture value decided on the basis of the object luminance. Information on a focal length is recorded as the focal length of the photo-taking lens 1.

The details of sequences of actions to be executed by the control circuit 41 are next described below with reference to flow charts beginning with FIG. 7.

Figure 7:
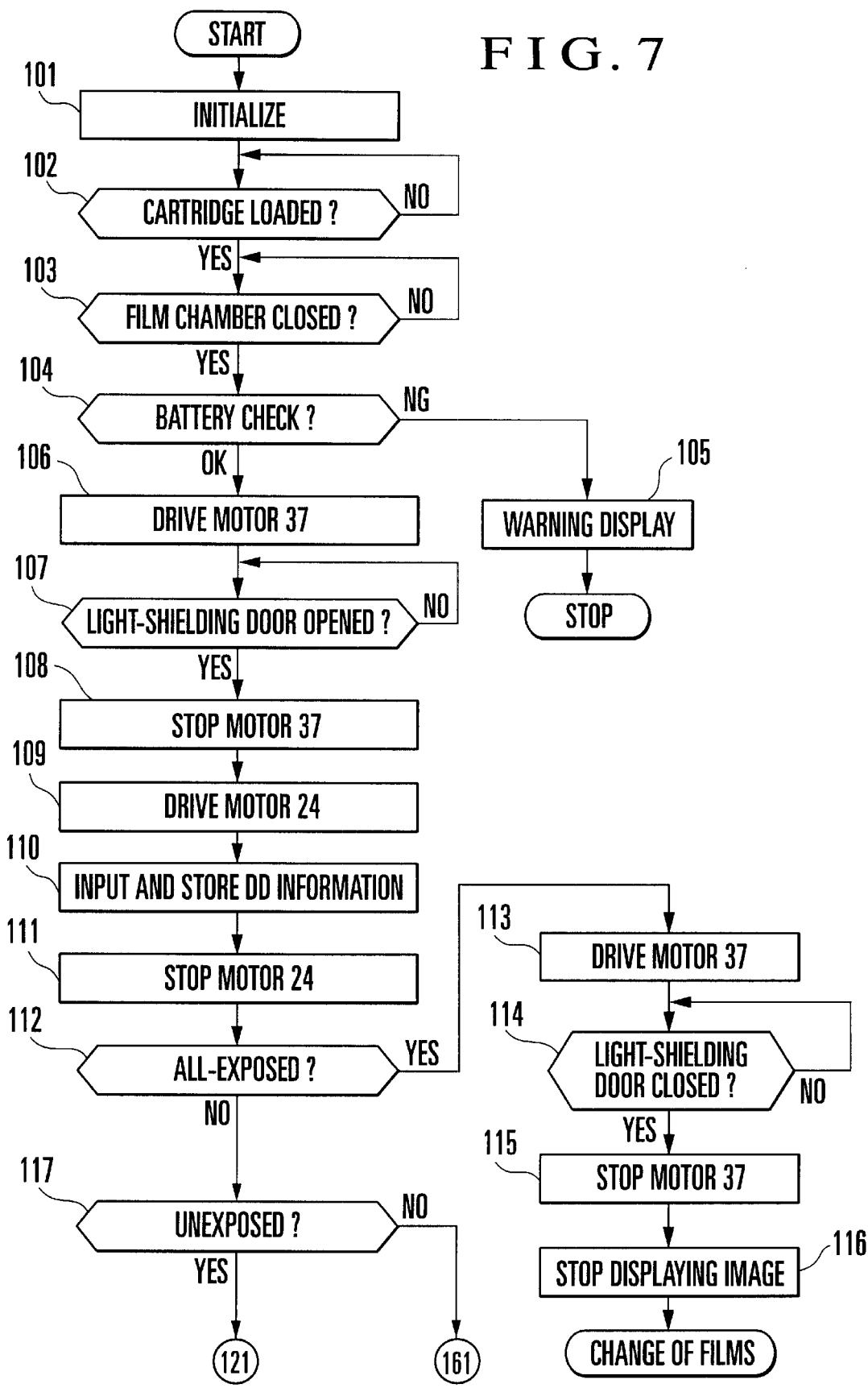
FIG. 7 is a flow chart showing in part a sequence of actions of the camera according to a first embodiment of the invention.

When a power supply switch (not shown) is turned on, the control circuit 41 becomes operative, and a flow of operation starts at a step 101 of FIG. 7.

At the step 101, the control circuit 41 acts to initialize its memory and ports. At a step 102, a check is made for the signal of the cartridge detecting switch 28 to find if the camera is loaded with the film cartridge 21. If so, the flow proceeds to a step 103. At the step 103, the flow waits until the film chamber (not shown) is closed with the knob 8 turned around. When the film chamber is closed, the flow proceeds to a step 104.

At the step 104, a signal outputted from the battery voltage detecting circuit 44 is A/D-converted to find if the battery voltage is sufficient for operating the camera. If not, the flow proceeds to a step 105 to have the display device 3 make a warning display to let the user know that the battery is not usable. After the warning display, the flow of operation comes to a stop. When the user replaces the battery with a new battery, the flow of operation begins again from the step 101.

If the battery voltage is decided at the step 104 to be sufficient, the flow proceeds from the step 104 to a step 106. At the step 106, a control signal is sent to the second motor driving circuit 47 to drive the second motor 37. At a step 107, a signal of the light-shielding door opening-and-closing detecting switch 39 is checked to find if the light-shielding door is opened. If so, the flow proceeds from the step 107 to a step 108. At the step 108, a control signal is sent to the second motor driving circuit 47 to bring the second motor 37 to a stop. At the next step 109, a control signal is sent to the first motor driving circuit 46 to drive the first motor 24 to rotate backward. This causes the information indicating disk 33 to begin to rotate. The backward rotation of the first motor 24 does not cause the film 22 to be sent out from the film cartridge 21.

At a step 110, a signal outputted from the film information reading circuit 34 (hereinafter referred to as DD information in the flow charts) is read. The signal, i.e., the DD information, is decoded to obtain information on the kind, the sensitivity, the number of photo-taking frames and the using (exposure) state of the film. At the next step 111, a control signal is sent to the first motor driving circuit 46 to bring the first motor 24 to a stop. At a step 112, a check is made to find if the information on the using state of the film thus obtained indicates a full exposed state. If so, the flow proceeds to a step 113. At the step 113, a control signal is sent to the second motor driving circuit 47 to drive the second motor 37. At a step 114, the signal of the light-shielding door opening-and-closing detecting switch 39 is checked to find if the light-shielding door is closed. If so, the flow proceeds from the step 114 to a step 115 to send a control signal to the second motor driving circuit 47 to bring the second motor 37 to a stop. At a step 116, if the monitor 9 is in a state of displaying an image, at the time of the step 116, a signal is sent to the image processing circuit 52 to stop the monitor 9 from making the image display. Then, the power supply for the monitor 9 and the image sensor 51 is turned off. If the monitor 9 is not making any image display at the time of the step 116, the step 116 is not necessary. After the step 115 or 116, the flow waits until the film cartridge is replaced.

In a case where the information on the using state of the film 22 is found at the step 112 to be not indicating the full exposed state, the flow proceeds from the step 112 to a step 117. At the step 117, a check is made to find if the information on the using state of the film indicates an unexposed state. If so, the flow proceeds from the step 117 to a step 121 of FIG. 8 to carry out a normal film loading action.

Figure 8:
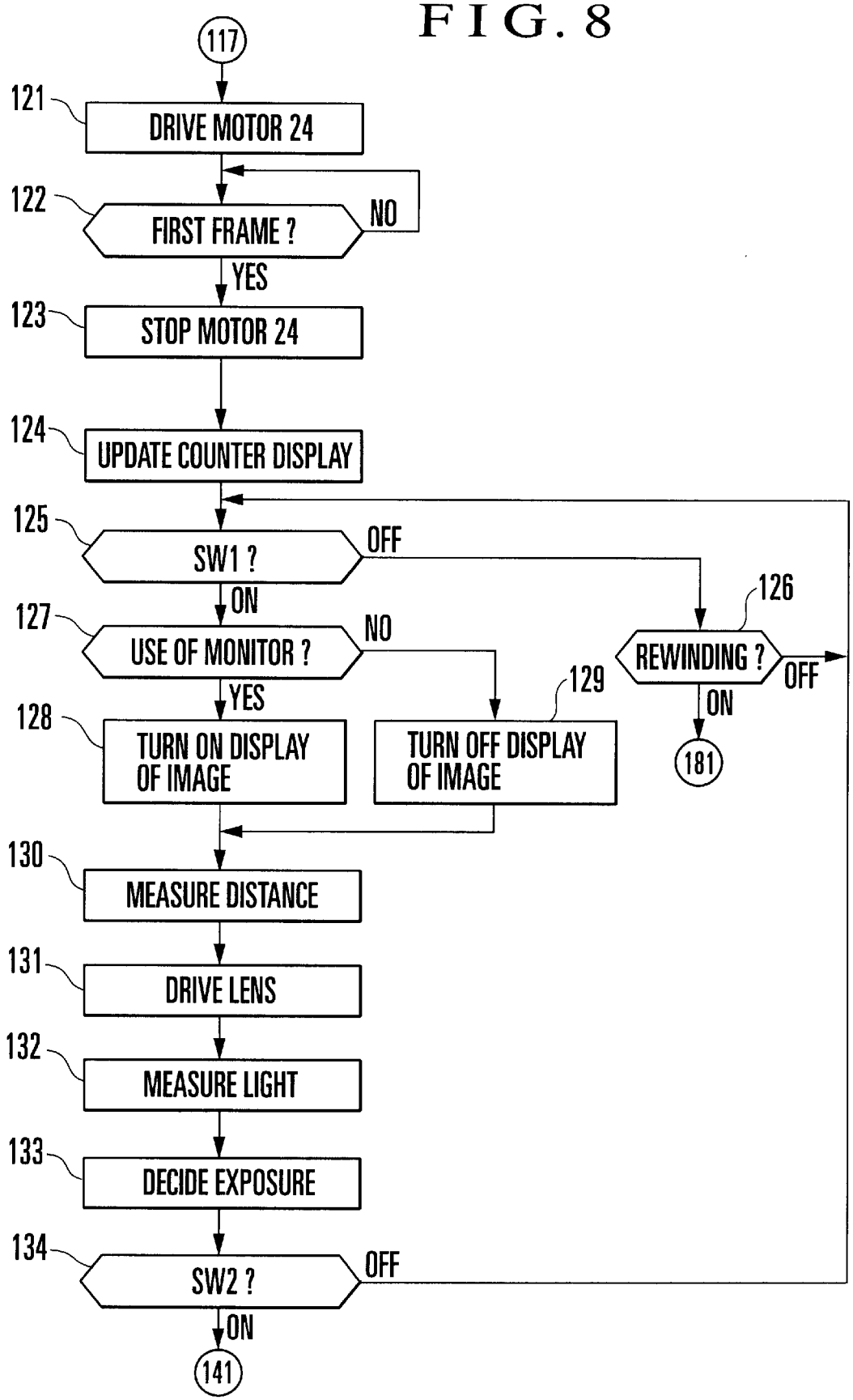
FIG. 8 is a flow chart also showing in part a sequence of actions of the camera according to the first embodiment of the invention.

At the step 121 of FIG. 8, a control signal is sent to the first motor driving circuit 46 to drive the first motor 24 to rotate forward. This causes the film 22 to begin to be sent out from the film cartridge 21. At the next step 122, the flow of operation waits until the first photo-taking frame of the film 22 is set at a predetermined photo-taking position according to a signal from the perforation detector 27. At a step 123, a control signal is sent to the first motor driving circuit 46 to stop the first motor 24 from rotating.

At a step 124, a display value of a film counter displayed by the display device 3 is updated. Since the film is new in this instance, the film counter display is made as "1". At a step 125, a check is made to find if a switch SW1 which is arranged to be turned on by a first stroke of operation on the shutter button 2 is in its on-state. If not, the flow proceeds from the step 125 to a step 126 to find if the rewinding switch 13 is in its on-state. If not, the flow returns to the step 125 to repeat the same step.

If the switch SW1 is found at the step 125 to be in its on-state, the flow proceeds from the step 125 to a step 127. At the step 127, a check is made to find if the selection switch 10 is in its on-state indicating the selection of use of the monitor 9. If so, the flow proceeds to a step 128. At the step 128, the image processing circuit 52 is rendered active to make an electronic image obtained by the image sensor 51 into a visible image. The visible image then begins to be displayed by the monitor 9 in real time. After that, the flow proceeds from the step 128 to a step 130. If the selection switch 10 is found at the step 127 not in its on-state, the monitor 9 is considered to be not used, and the flow proceeds from the step 127 to a step 129. At the step 129, the image processing circuit 52 is rendered inactive. Then, the image sensor 51 and the monitor 9 are both stopped from acting. In this instance, the supply of electric power may be brought to a stop to minimize consumption of electric power. After the step 129, the flow proceeds to the step 130.

At the step 130, information on a distance to the object is obtained from the distance measuring sensor 43. Further, according to the information on the distance to the object thus obtained, a lens driving amount required for bringing the photo-taking lens 1 into an in-focus state is computed. At a step 131, a signal is sent to the third motor driving circuit 48 to cause the third motor 49 to drive a focusing lens according to the lens driving amount computed. At a step 132, information on the object luminance is obtained from the light measuring sensor 42. At a step 133, an exposure is decided on the basis of a shutter speed and an aperture value decided according to the information on the luminance of the object and information on the sensitivity of the film 22 obtained at the step 110 described in the foregoing. In that instance, a decision is made as to whether or not a photo-taking operation is to be performed with the aid of the flash device 56.

At the next step 134, a check is made to find if a switch SW2 which is arranged to be turned on by a second stroke of operation on the shutter button 2 is in its on-state. If not, the flow returns to the step 125 to repeat the above-stated steps. If so, the flow proceeds from the step 134 to a step 141 of FIG. 9.

Figure 9:
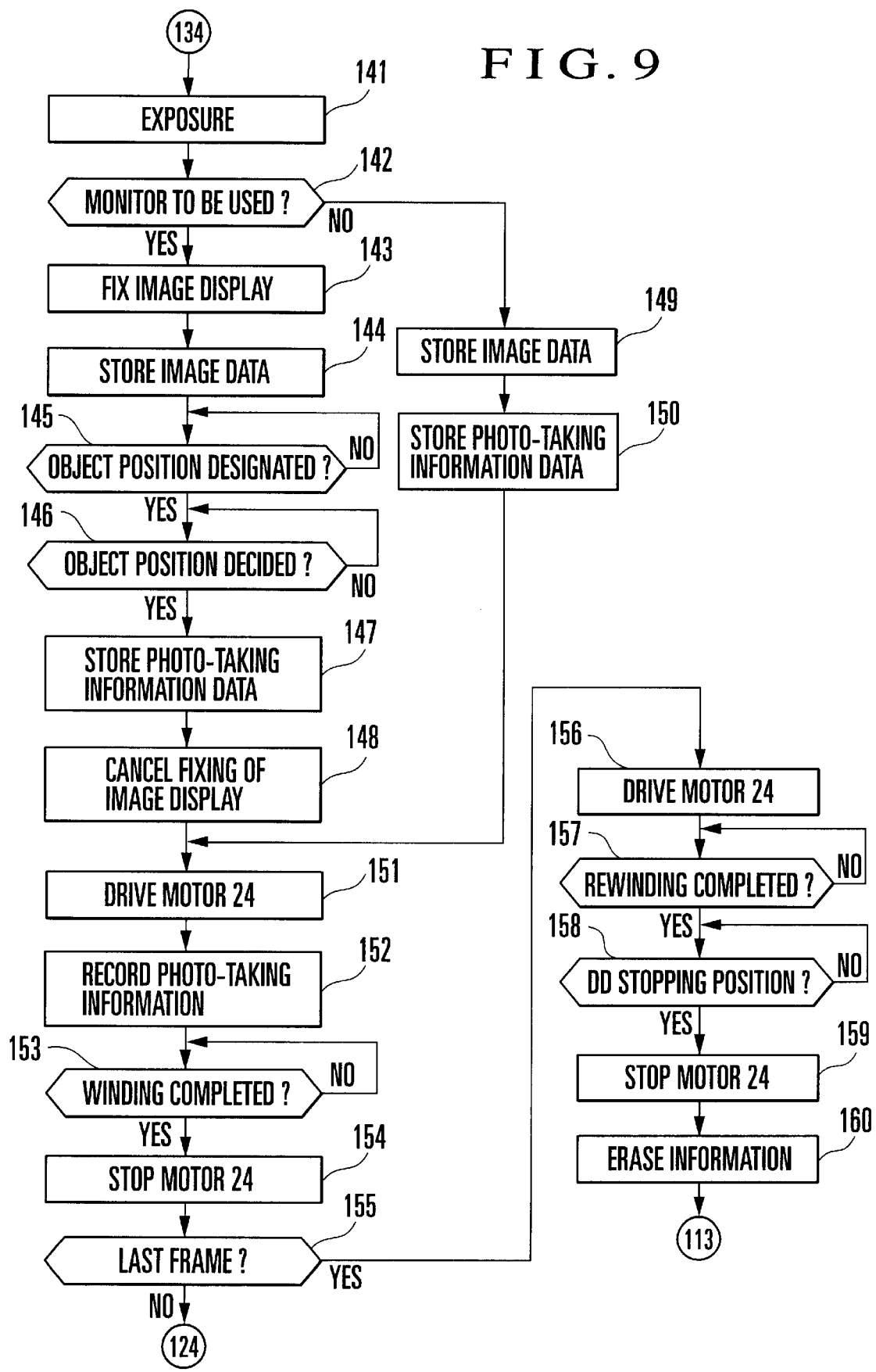
FIG. 9 is a flow chart also showing in part a sequence of actions of the camera according to the first embodiment of the invention.

At the step 141 of FIG. 9, the shutter 45 is controlled according to the exposure decided at the step 133. In a case where the flash device 56 is decided to be used, a control signal is sent to the flash device 56 to emit light. An exposure action is thus carried out on the film 22. Meanwhile, a control signal is sent to the image processing circuit 52 to cause the image sensor 51 to pick up an image in accordance with the timing of the exposure action on the film 22 irrespective as to whether the monitor 9 is to be used or not.

At the next step 142, a check is made for the state of the selection switch 10 to find if the monitor 9 is to be used. If so, the flow proceeds to a step 143. At the step 143, a control signal is sent to the image processing circuit 52 to have the electronic image which has been on display in real time changed over to a still image. The still image thus obtained can be regarded as an electronic image picked up at a point of time substantially the same as the point of time at which the exposure action is performed on the film 22 at the step 141. The still image, therefore, approximately coincides with a latent image formed on the film by the exposure. At a step 144, the image data of the still image currently on display is transferred to the external memory 53 as image data of the film in use. In a case where a photo-taking operation is further carried on by using the same film, this data is superscribed and updated every time the flow passes this step 144 or another step 149 which will be described later. In other words, the external memory 53 always stores the image data of the frame last used for photo-taking.

At a step 145, the flow waits for input of the position of a main object designated by the user. In the case of such a photo-taking image as shown in FIG. 6B, the user designates the position "12" shown in FIG. 6A while watching an electronic image displayed by the monitor 9. The main object position can be designated in various manners. For example, a cursor may be moved by using the cross switch 12, or, with a touch-panel-like keys arranged on the surface of the monitor 9, the position of the main object may be pointed with a finger. At the next step 146, the flow waits until the designated main object position is established with the defining switch 11 turned on. With the switch 11 turned on, the flow proceeds from the step 146 to a step 147.

At the step 147, photo-taking information data of varied kinds including data of main object position relative to the current photo-taking frame is transferred to the external memory 53 to be stored there as the photo-taking information relative to the film in use. In a case where the photo-taking operation is further carried on by using the same film, this stored data is also superscribed and replaced with new data every time the flow of operation passes by this step 147 or a step 150 which will be described later. In other words, for one and the same film, it is always the data of photo-taking information relative to a frame last used for photo-taking that is stored in the external memory 53. At the next step 148, the image which has been on display in a state of a still memory, i.e., in a fixed state, at the monitor 9 is cancelled and changed into a display in real time by sending a control signal to the image processing circuit 52. The flow then proceeds from the step 148 to a step 151.

If the selection switch 10 is found at the step 142 to be in its off-state thus indicating nonuse of the monitor 9, the flow proceeds from the step 142 to a step 149. At the step 149, the data of the electronic image picked up at the step 141 is transferred to and stored in the external memory 53 as the image data of the film in use. The manner in which the image data is stored is the same as what has been described above for the step 144. At the next step 150, the data of photo-taking information of varied kind relative to the applicable photo-taking frame is transferred to and stored in the external memory 53 as the photo-taking information data of the film in use. The manner in which the photo-taking information data is stored is the same as what has been described above for the step 147.

However, since the monitor 9 is not used in this instance, the photo-taking image cannot be seen on the monitor 9. Therefore, input of the information on the main object position is inhibited for the purpose of avoiding erroneous input of the information. With regard to the information on the main object position, therefore, either default data indicating the center position "13" of the image plane, for example, is stored or the information on the main object position is not stored and also not magnetically recorded on the film 22 when the monitor 9 is not used. The flow then proceeds from the step 150 to the step 151.

At the step 151, a control signal is sent to the first motor driving circuit 46 to drive the first motor 24 to rotate forward. The film then begins to be wound. At a step 152, a signal is sent to the magnetic signal interface circuit 50. In response to this signal, the magnetic signal interface circuit 50 causes a recording current to flow to the magnetic head 31. The magnetic head 31 then records information in the magnetic track 30 on the film 22 according to the photo-taking information data stored. At a step 153, the flow waits until the next frame of the film 22 is found to have been set at a predetermined photo-taking position through a signal from the perforation detector 27, after the photo-taking information is recorded. At a step 154, a control signal is sent to the first motor driving circuit 46 to stop the first motor 24.

At a step 155, a check is made to find if the photo-taking operation on the last frame of the film 22 has come to an end. If not, the flow returns to the step 124 to repeat the steps described in the foregoing. If so, the flow proceeds to a step 156. At the step 156, a control signal is sent to the first motor driving circuit 46 to drive the first motor 24 to rotate backward. The film 22 then begins to be rewound. At the next step 157, the flow waits until the film 22 is found to have been completely rewound into the film cartridge 21 through the signal of the perforation detector 27, etc. At a step 158, by reading a signal coming from the film information reading circuit 34, the flow waits until the position of the information indicating disk 33 comes to a predetermined position indicating a completely exposed state.

At a step 159, a control signal is sent to the first motor driving circuit 46 to bring the rotation of the first motor 24 to a stop. At a step 160, since the film 22 in use has been completely exposed, the image data and photo-taking information data for the film 22 are erased. After that, the flow proceeds from the step 160 to the steps 113, etc., and waits until the film 22 is taken out from the camera.

Figure 10:
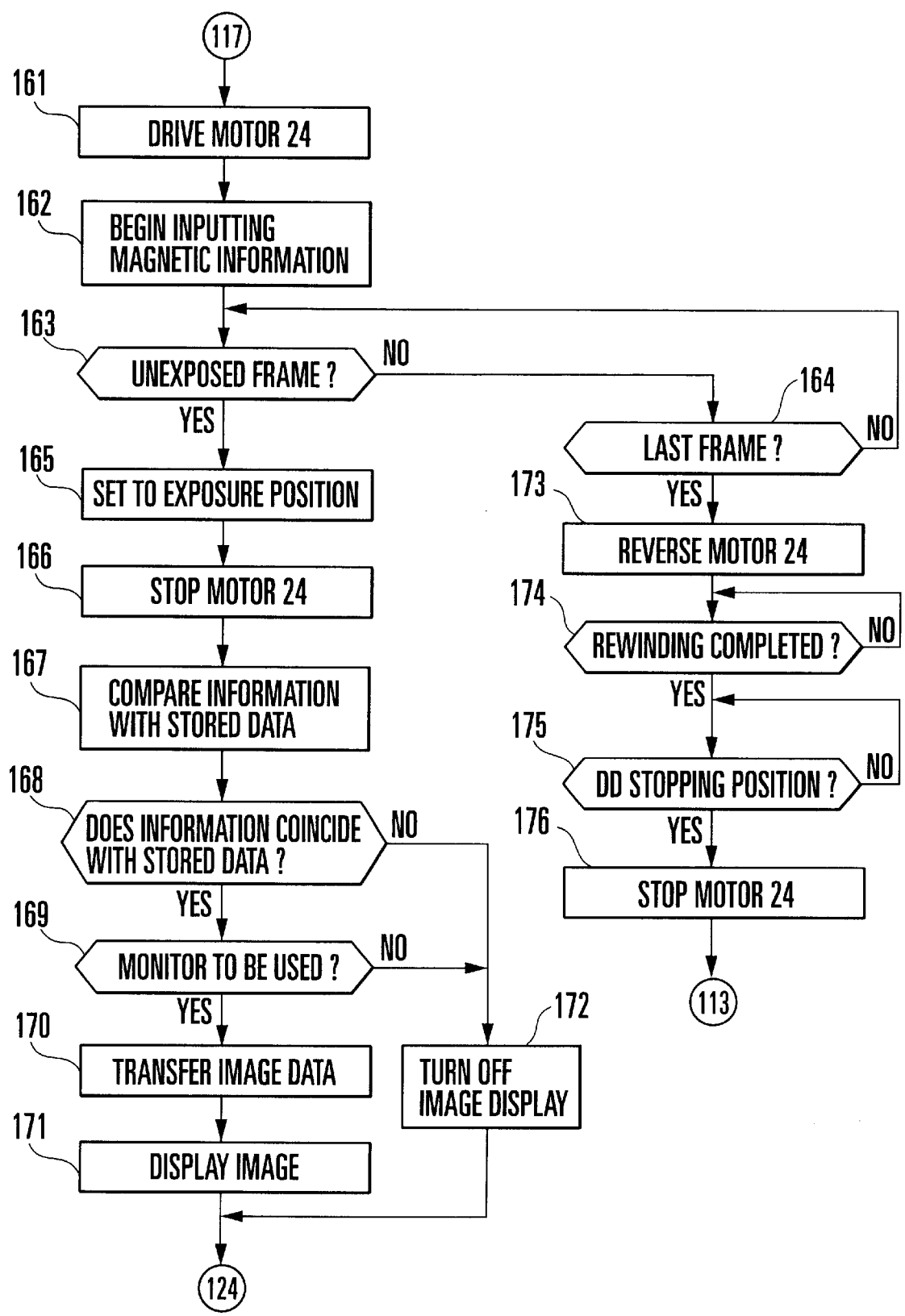
FIG. 10 is a flow chart also showing in part a sequence of actions of the camera according to the first embodiment of the invention.

In a case where the film 22 is found at the step 117 to be not in the unexposed state, the film is decided to be in a partially exposed state, and the flow proceeds from the step 117 to a step 161 shown in FIG. 10.

At the step 161 of FIG. 10, a control signal is sent to the first motor driving circuit 46 to drive the first motor 24 to rotate forward. This causes the film 22 to be moved forward. At a step 162, input of a signal from the magnetic signal interface circuit 50 begins to give the record of photo-taking information from the magnetic track of the film 22. At a step 163, a check is made on the basis of the fact that a frame having photo-taking information recorded there is to be decided as an exposed frame and a frame having no photo-taking information recorded there is to be decided as an unexposed frame. While the frame portions of the film 22 is fed one by one, each of the frames is checked for an unexposed state. If a frame currently checked is found to be not unexposed, i.e., to be exposed, the flow proceeds to a step 164. At the step 164, a check is made to find if this exposed frame is the last frame of the film 22. If not, the flow returns to the step 163.

Then, at the step 163, the next frame is checked to find if it is unexposed. If so, the flow proceeds from the step 163 to a step 165 to wait until the signal from the perforation detector 27 comes to indicate that the next frame is set in the predetermined photo-taking (exposure) position. At the next step 166, a control signal is sent to the first motor driving circuit 46 to bring the first motor 24 to a stop. At a step 167, the photo-taking information on the last exposed frame which precedes the detected unexposed frame by one frame is decoded. The decoded information is collated with the photo-taking information data of a film which was rewound midway in the past and stored in the external memory 53. A manner in which the photo-taking information data of a midway rewound film will be described later herein.

At the next step 168, a check is made for the result of the collation to find if there is any data that coincides with the decoded photo-taking information data. If so, the flow proceeds to a step 169. At the step 169, a check is made to find if the selection switch 10 is in its on-state thus indicating that use of the monitor 9 is selected. If so, the flow proceeds to a step 170. At the step 170, image data which is correlated to the stored photo-taking information data of the midway rewound film and is also stored in the external memory is transferred to the image processing circuit 52. At the next step 171, a control signal is sent to the image processing circuit 52 to have the transferred image data displayed by the monitor 9. This display enables the user to know what image is last obtained on the film currently loaded. Upon completion of the step 171, the flow returns to the step 124 of FIG. 8.

In cases where no coinciding data is found at the step 168 or where use of the monitor 9 is not selected at the step 169, the flow proceeds from the step 168 or 169 to a step 172. At the step 172, since an image display is not required or cannot be made in this instance, a control signal is sent to the image processing circuit 52 to make no display on the monitor 9. The flow then returns from the step 172 to the step 124 of FIG. 8.

If the checked frame is found at the step 164 to be the last frame of the film 22, the flow proceeds from the step 164 to a step 173. At the step 173, a control signal is sent to the first motor driving circuit 46 to drive the first motor 24 to rotate backward. The film 22 then begins to be rewound. At the next step 174, the flow waits until the film 22 is found through the signal of the perforation detector 27 or the like to have been completely rewound into the film cartridge 21. At a step 175, by reading the signal of the film information reading circuit 34, the flow waits until the position of the information indicating disk 33 comes to a predetermined position indicating a completely exposed state. At a step 176, a control signal is sent to the first motor driving circuit 46 to stop the first motor 24. After that, the flow proceeds from the step 176 to the steps 113, etc., to wait until the film 22 is taken out.

Figure 11:
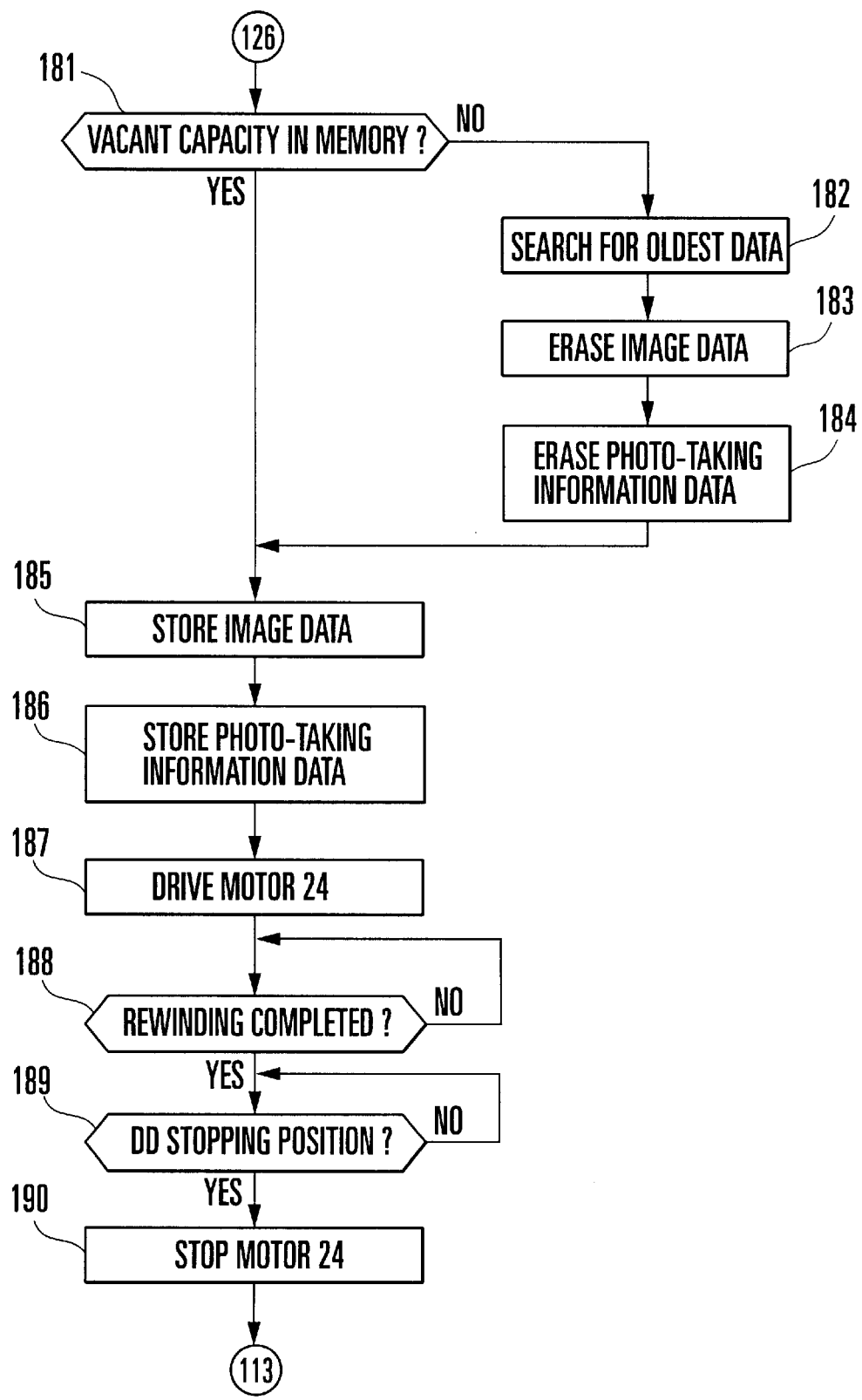
FIG. 11 is a flow chart also showing in part a sequence of actions of the camera according to the first embodiment of the invention.

In a case where the rewinding switch 13 is found at the step 126 to be in its on-state, the flow proceeds from the step 126 to a step 181 of FIG. 11.

At the step 181 of FIG. 11, a check is made to find if the external memory 53 still has a sufficient vacant capacity for storing image data and photo-taking information data of the midway rewound film. If not, the flow proceeds to a step 182. At the step 182, a search is made for the oldest of photo-taking information data of photo-taking year, month, day, hour and minute of midway rewound films stored in the external memory 53. At a step 183, image data corresponding to the oldest photo-taking information data searched out is erased from the external memory 53. At a step 184, the oldest photo-taking information searched out is erased from the external memory 53.

If the external memory 53 is found at the step 181 to have a sufficient vacant capacity for storing the image data and the photo-taking information data of the midway rewound film, the flow proceeds from the step 181 to a step 185 without going through the steps 182, 183 and 184. At the step 185, the image data which corresponds to the film in use and stored at the steps 144 or the step 149 is additionally stored in the external memory 53 as image data of the midway rewound film 22 in use. At the next step 186, the photo-taking information data which corresponds to the film 22 in use and stored at the step 147 or 150 is additionally stored in the external memory 53 as photo-taking information data of the midway rewound film 22 in use.

FIG. 18 shows a memory map. The following describes how the image data and photo-taking information data of films are stored in the external memory 53 with reference to the memory map shown in FIG. 18.

The external memory 53 is assumed to have a storage capacity for storing the image data and the photo-taking information data for 11 films. Generally, one address is assigned to every one byte. In storing image data in the memory, at least several kilo bytes are necessary though it varies with the size and compression rate of image. In storing photo-taking information data in the memory, several to scores of bytes are necessary. However, for the sake of simplification of illustration, the memory map is arranged as a model in which both the image data and the photo-taking information data are represented by one byte.

Referring to FIG. 18, the photo-taking information data is stored in areas indicated by even-number addresses beginning with "A". The image data is stored in areas indicated by odd-number addresses beginning with "A+1". The photo-taking information data of the film currently loaded is stored in an area of an address A at the step 147 or 150 of FIG. 9. The image data of the film currently loaded is stored at an area of address A+1 and is stored at the step 144 or 149 of FIG. 9.

When the film is rewound midway of use of the film for the first time, the photo-taking information data stored in the area of the address A is shifted to an area of an address A+2 to be stored there at the step 186 of FIG. 11. At the same time, the image data stored at the area of the address A+1 is shifted to an area of an address A+3 to be stored there at the step 185.

Under this condition, when the second film is rewound midway of the use thereof, the photo-taking information data which is stored at the area of the address A is shifted to the area of an address A+4 to be stored there at the step 186 as the areas of the addresses A+2 and A+3 are already in use. At the same time, the image data stored at the area of the address A+1 is shifted to the area of an address A+5 to be stored there at the step 185. In this manner, the photo-taking information data and the image data corresponding to ten midway rewound films can be stored.

When a film is rewound midway before complete use thereof, while the external memory 53 is in a state of having the data for ten films already stored therein, the oldest of the data stored is erased at the steps 181 to 184 as described above. In a case where a midway rewound film is reloaded and is completely used up to the last frame thereof, the data of the film is erased at the step 160 of FIG. 9.

Referring again to FIG. 11, at a step 187, a control signal is sent to the first motor driving circuit 46 to drive the first motor 24 to rotate backward. This causes the film 22 to begin to be rewound. At a step 188, the flow waits until the film 22 is found to be completely rewound into the film cartridge 21 through the signal of the perforation detector 27 or the like. At the next step 189, while reading a signal outputted from the film information reading circuit 34, the flow waits until the position of the information indicating disk 33 comes to a predetermined stop position where it indicates a partially exposed state. At a step 190, a control signal is sent to the first motor driving circuit 46 to stop the first motor 24. After that, the flow proceeds to the step 113 to execute the step 113 and steps subsequent thereto and waits until the film 22 is taken out.

As described above, for partially exposed films which are used only midway before complete use thereof, the image data and the photo-taking information data of their last exposed frames are stored within the camera, at the steps 181 to 186 of FIG. 11, as much as the capacity of the external memory 53 permits.

In a case where a rewound film is reloaded on the camera, the photo-taking information data recorded on the film is collated with the photo-taking information data stored in the camera (at the step 167) as described above with reference to the flow chart of FIG. 10. If the photo-taking information data of the reloaded film is found to coincide with the photo-taking information data stored in the camera, the image data of the last exposed frame stored in the camera can be displayed on the monitor 9 at the step 171.

The first embodiment of the invention is arranged and operates as described above.

Second Embodiment

The first embodiment described above is arranged such that the photo-taking information data and the image data of each film stored in the external memory 53 are data corresponding to the last exposed frame of the film. However, the invention is not limited to this arrangement.

In the case of a second embodiment of the invention, the photo-taking information data of each film to be stored in the external memory 53 is arranged to be the photo-taking information data corresponding to the first exposed frame of the film. On the other hand, the image data to be stored in the external memory 53 is arranged to be the image data corresponding to the last exposed frame of the film. With the exception of this difference, the second embodiment is the same as the first embodiment in respect to arrangement of FIG. 1 to FIGS. 6A and 6B and the concept of the memory map shown in FIG. 18.

Among the procedures of the flow charts to be executed by the control circuit 41 in the first embodiment described above, the control circuit 41 in the second embodiment is arranged to execute the steps shown in the flow charts of FIGS. 7 and 8 in the same manner as the steps described above. However, the control circuit 41 in the second embodiment executes steps of a flow chart shown in FIG. 12 in place of the steps of the flow chart of FIG. 9, steps of a flow chart shown in FIG. 13 in place of the steps of the flow chart of FIG. 10, and steps of a flow chart shown in FIG. 14 in place of the steps of the flow chart of FIG. 11. Therefore, the second embodiment is described below with reference to the flow charts of FIGS. 12, 13 and 14 which differ from the procedures of the first embodiment.

Figure 12:
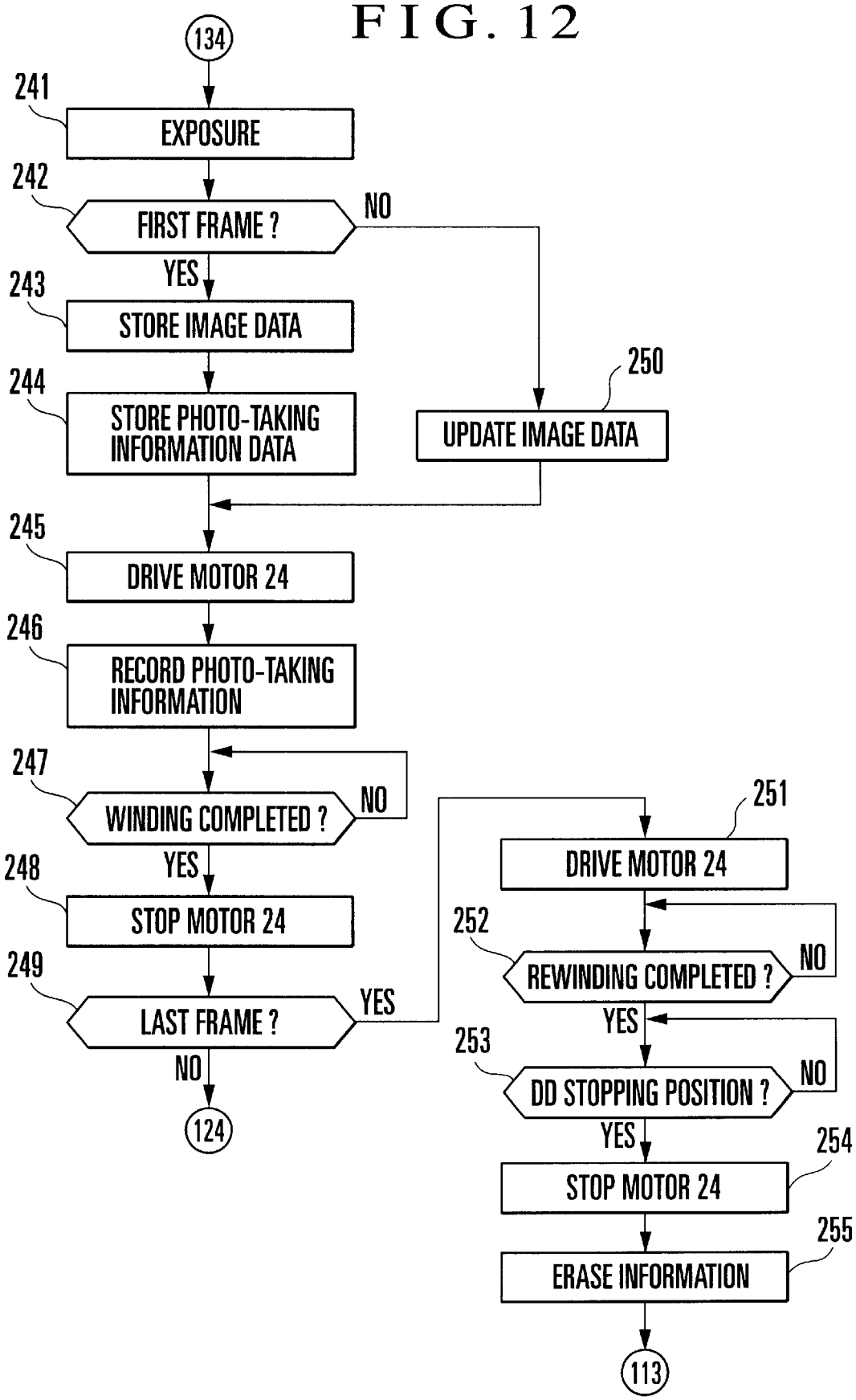
FIG. 12 is a flow chart showing in part a sequence of actions of essential parts of the camera according to a second embodiment of the invention.

In a case where the switch SW2 is found at the step 134 of FIG. 8 to be in its on-state, the flow of operation proceeds to a step 241 of FIG. 12.

At the step 241, the shutter 45 is controlled according to an exposure value decided at the step 133 described in the foregoing. If use of the flash device 56 has been decided, a control signal is sent out to cause the flash device 56 to emit light. An exposure action is thus performed on the film 22. Further, a control signal is sent to the image processing circuit 52 to have the image sensor 51 pick up an image according to the timing of the exposure action on the film irrespective of use or nonuse of the monitor 9.

At a step 242, a check is made to find if the film currently in use is at the position of the first photo-taking frame. If so, the flow proceeds to a step 243. At the step 243, electronic image data obtained at the step 241 is transferred to and stored in the external memory 53 as the image data of the film 22. The image data is of a still image which is picked up at substantially the same time when the exposure action is performed on the film 22 and thus approximately coincides with a latent image formed on the film by the exposure. At a step 244, photo-taking information data of varied kinds relative to the exposed frame of the film 22 is transferred to and stored in the external memory 53. In a case where the photo-taking operation is further carried on by using the same film 22, the photo-taking information data thus stored remains in store as it is without being rewritten. In other words, the photo-taking information data which is obtained for a frame first used (exposed) for photo-taking is always stored for each of different films.

At the next step 245, a control signal is sent to the first motor driving circuit 46 to drive the first motor 24 to rotate forward. This causes the film 22 to begin to be wound. At a step 246, a signal is sent to the magnetic signal interface circuit 50 to have a recording current flow to the magnetic head 31 for magnetically recording information in the magnetic track 30 on the film 22. At a step 247, the flow waits until the next frame of the film 22 is found through a signal coming from the perforation detector 27 to have been set in the predetermined photo-taking position after completion of recording the photo-taking information.

At a step 248, a control signal is sent to the first motor driving circuit 46 to stop the first motor 24. At a step 249, a check is made to find if photo-taking on the last frame of the film 22 is finished. If not, the flow returns to the step 124 of FIG. 8 to repeat the steps described in the foregoing. If so, the flow proceeds from the step 249 to a step 251.

If the position of the film 22 is found at the step 242 to be not the first frame, the flow proceeds to a step 250 without executing the steps 243 and 244. At the step 250, electronic image data obtained at the step 241 is transferred to and stored in the external memory 53 as the image data of the film 22. Unlike the photo-taking information data, the image data is arranged to be updated with the image data of a frame last used for photo-taking every time a shot is taken. After that, the flow proceeds from the step 250 to the step 245.

With photo-taking on the last frame of the film 22 found at the step 249 to have been finished, the flow proceeds to the step 251 as mentioned above. At the step 251, a control signal is sent to the first motor driving circuit 46 to drive the first motor 24 to rotate backward. The film 22 then begins to be rewound. At the step 252, the flow waits until the film 22 is found, for example, through the signal of the perforation detector 27 to be completely rewound into the film cartridge 21. At a step 253, the flow waits, while reading the signal of the film information reading circuit 34, until the information indicating disk 33 comes to its predetermined position where it indicates completion of exposure of all frames of the film 22. At a step 254, a control signal is sent to the first motor driving circuit 46 to stop the first motor 24. At a step 255, since the film 22 has been completely exposed, the image data and the photo-taking information data stored in the external memory 53 are erased. After that the flow proceeds from the step 255 to the steps 113, etc., to wait until the film 22 is taken out from the camera.

Figure 13:
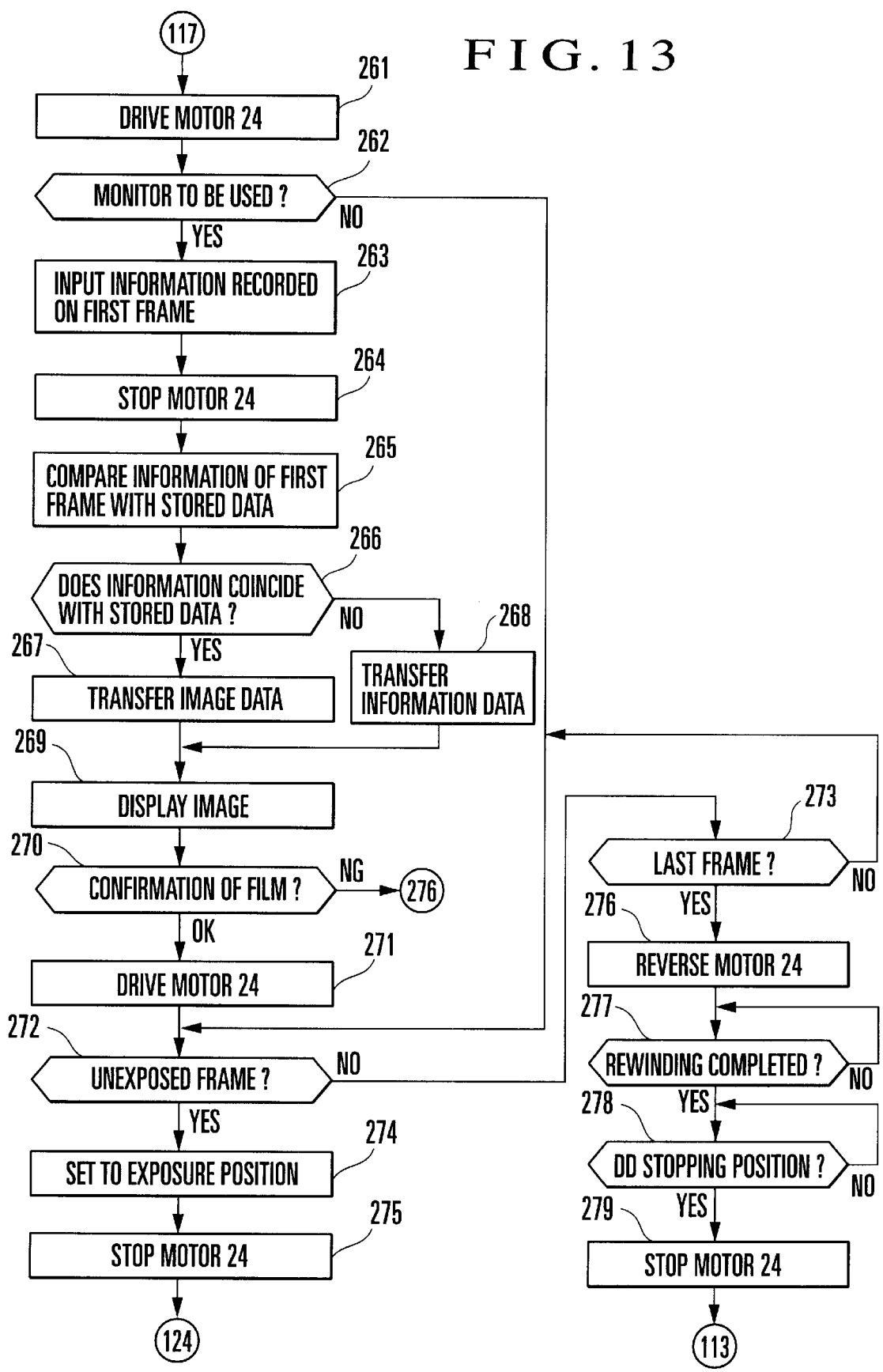
FIG. 13 is a flow chart also showing in part a sequence of actions of essential parts of the camera according to the second embodiment of the invention.

If the information on the exposure state of the film 22 is found at the step 117 to be not an unexposed state, the film is decided to be in a partially exposed state, and the flow proceeds to a step 261 of FIG. 13.

At the step 261, a control signal is sent to the first motor driving circuit 46 to drive the first motor to rotate forward. The film begins to be moved forward. At a step 262, a check is made to find if the selection switch 10 which is provided for selection of use of the monitor 9 is in its on-state. If so, use of the monitor 9 is decided, and the flow proceeds to a step 263. At the step 263, to obtain photo-taking information recorded in the magnetic track 30 of the first frame of the film, a signal input is received from the magnetic signal interface circuit 50. At the next step 264, a control signal is sent to the first motor driving circuit 46 to stop the first motor 24. The film 22 is then put to a pause in a state of being pulled out to a point near the first frame thereof. At a step 265, the photo-taking information on the first frame inputted is decoded. The decoded photo-taking information is collated with the photo-taking information data of each of midway rewound films stored in the external memory 53.

At a step 266, a check is made for the result of collation to find if there is any data that coincides with the data of the photo-taking information inputted. If so, the flow proceeds to a step 267. At the step 267, image data which is also stored in the external memory 53 in a state of being correlated with the photo-taking information data of the midway rewound film in store is transferred to the image processing circuit 52. After that, the flow proceeds from the step 267 to a step 269. If no coinciding data is found at the step 266, the flow proceeds to a step 268. At the step 268, in place of image data, a photo-taking information signal recorded on the film is converted into a form in which the information signal can be displayed on the monitor 9 and is transferred to the image processing circuit 52. After that, the flow proceeds from the step 268 to the step 269.

At the step 269, a control signal is sent to the image processing circuit 52 to display on the monitor 9 either the image data transferred at the step 267 or the photo-taking information data transferred at the step 268. This display enables the user to know the image last taken or the photo-taking information on the film with which the camera is just loaded. At a step 270, a check is made to find if the image or photo-taking information displayed on the monitor 9 is what is intended by the user by receiving an acknowledging signal input from the user. The input of acknowledgement by the user can be received by various methods. For example, in one method for receiving the input of acknowledgement, characters "Y" and "N" and a cursor for pointing at either of the characters are displayed on the image plane of the monitor 9. The cursor is movable by means of the cross switch 12. If the defining switch 11 is turned on in a state of having the cursor pointing at the character "Y", the input indicates that the film is the one intended by the user. If the switch 11 is turned on in a state of having the cursor pointing at the character "N", the input indicates that the film is not the one intended by the user. In the former case, the flow proceeds to a step 271.

At the step 271, a control signal is sent to the first motor driving circuit 46 to drive the first motor 24 to rotate forward. This causes the film 22 to begin to be moved forward again. At the same time, the action of reading the photo-taking information recorded in the magnetic track 30 on the film 22 is also resumed. At the next step 272, a check is made on the basis of deciding a frame at which photo-taking information is recorded to be an exposed frame and a frame at which no photo-taking information is recorded to be an unexposed frame. Frames are checked one by one in this manner while the film is on the forward movement. If a frame checked is found to be not an unexposed frame, the flow proceeds to a step 273. At the step 273, the same frame is checked to find if this frame is the last frame. If not, the flow returns to the step 272 to make a check to find if the next frame is an unexposed frame.

When an unexposed frame is found, the flow proceeds from the step 272 to a step 274. At the step 274, the flow waits until the unexposed frame is found to have been set at a predetermined photo-taking (exposure) position through the signal of the perforation detector 27. At a step 275, a control signal is sent to the first motor driving circuit 46 to stop the first motor 24. After the step 275, the flow returns to the step 124 of FIG. 8.

In a case where the last frame of the film 22 is found at the step 273, the flow proceeds from the step 273 to a step 276. At the step 276, a control signal is sent to the first motor driving circuit 46 to drive the first motor 24 to rotate backward. This causes the film 22 to be rewound. At the next step 277, the flow waits until the film 22 is found to have been completely rewound into the film cartridge 21 through, for example, the signal of the perforation detector 27. At a step 278, while reading a signal from the film information reading circuit 34, the flow waits until the information indicating disk 33 comes to a predetermined position where it indicates completion of exposure for all frames of the film 22. At a step 279, a control signal is sent to the first motor driving circuit 46 to stop the first motor 24. After that, the flow proceeds to the steps 113, etc., and waits until the film 22 is taken out from the camera.

Figure 14:
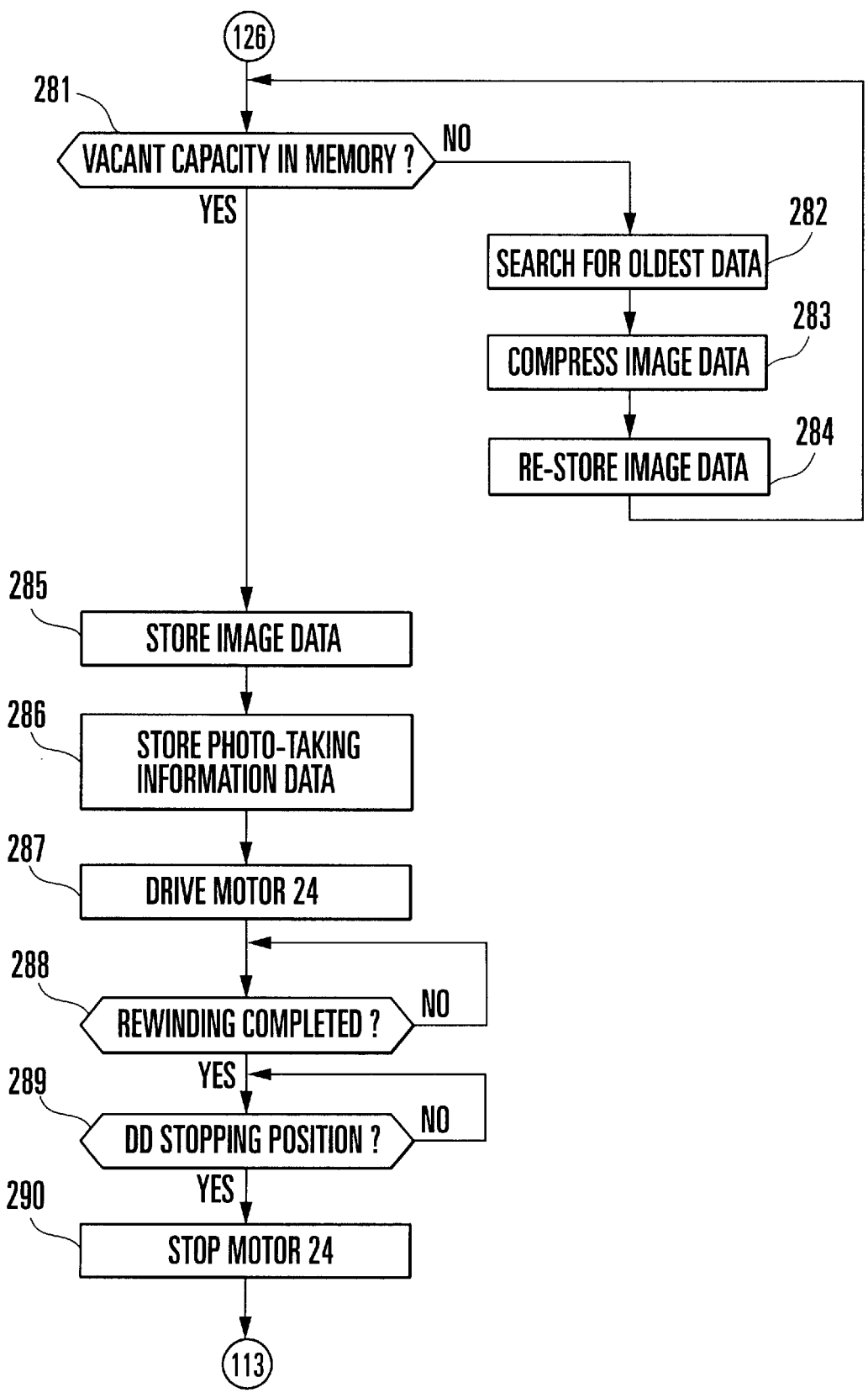
FIG. 14 is a flow chart also showing in part a sequence of actions of essential parts of the camera according to the second embodiment of the invention.

In a case where the rewinding switch 13 is found at the step 126 of FIG. 8 to be in its on-state, the flow proceeds from the step 126 to a step 281 of FIG. 14.

At the step 281, a check is made to find if the external memory 53 still has a sufficient vacant capacity for storing the image data and photo-taking information data for a midway rewound film. If not, the flow proceeds to a step 282. At the step 282, a search is made for the oldest of photo-taking information data of photo-taking year, month, day, hour and minute of midway rewound films stored in the external memory 53. At a step 283, image data corresponding to the oldest photo-taking information data searched out is compressed into a state requiring a less amount of storage capacity for the image data. The image data can be compressed by various known methods, including a JPEG compression method, a fractal compression method, a photo YCC method, etc. At a step 284, the compressed image data is again stored in the external memory 53.

In a case where the image data is compressed by the JPEG compression method or the like, when the image of the compressed image data is reproduced, the quality of the image thus reproduced becomes inferior particularly if the rate of compression is high. However, in some cases, this arrangement of the second embodiment is preferable to the arrangement of the first embodiment which simply erases old image data from the external memory 53. Further, since the amount of compressed image data varies with the contents of the image, the amount of image data storable in relation to the predetermined storage capacity of the external memory 53 is variable.

After execution of the steps described above, the flow returns from the step 284 to the step 281. Then, if the vacant capacity of the external memory 53 is sufficient for storing the image data and the photo-taking information data of the midway rewound film, the flow of operation proceeds from the step 281 to a step 285.

At the step 285, the image data which corresponds to the film in use and stored at the step 243 or 250 is additionally stored in the external memory 53 as image data of the midway rewound film 22 in use. At the next step 286, the photo-taking information data which corresponds to the film 22 in use and stored at the step 244 is additionally stored in the external memory 53 as photo-taking information data of the midway rewound film 22 in use. At a step 287, a control signal is sent to the first motor driving circuit 46 to drive the first motor 24 to rotate backward. This causes the film 22 to begin to be rewound.

At a step 288, the flow waits until the film 22 is found to be completely rewound into the film cartridge 21 through, for example, the signal of the perforation detector 27. At the next step 289, while reading a signal outputted from the film information reading circuit 34, the flow waits until the position of the information indicating disk 33 comes to a predetermined stop position where it indicates a partially exposed state. At a step 290, a control signal is sent to the first motor driving circuit 46 to stop the first motor 24. After that, the flow proceeds to the step 113 and steps subsequent thereto and waits until the film 22 is taken out.

As described above, for partially exposed films which are used only midway before complete use, the image data of their last frame and the photo-taking information data of their first frames are stored within the camera, at the steps 224 to 250 of FIG. 11, as much as the capacity of the external memory 53 permits.

In a case where a rewound film is reloaded on the camera, the photo-taking information data recorded on the film is collated with the photo-taking information data stored in the camera at the step 265 as described above with reference to the flow chart of FIG. 13. If the photo-taking information data of the reloaded film is found to coincide with the photo-taking information data stored in the camera, the image data of the last photo-taking frame stored in the camera can be displayed on the monitor 9 at the step 267.

The second embodiment of the invention is arranged and operates as described above.

Third Embodiment

In each of the first and second embodiments described above, the information to be stored in the external memory 53 for the purpose of identifying a film loaded on the camera in a partially exposed state is the photo-taking information data of the last or first exposed frame of the film. However, the invention is not limited to such an arrangement.

In the case of a third embodiment of the invention, information to be stored in the external memory 53 for identifying a film loaded on the camera in a partially exposed state is recorded in the leader part of the film as identification information. The arrangement shown in FIG. 1 to FIGS. 6A and 6B and the concept of the memory map of FIG. 18 apply also to the third embodiment in the same manner as the first and second embodiments described above.

Figure 16:
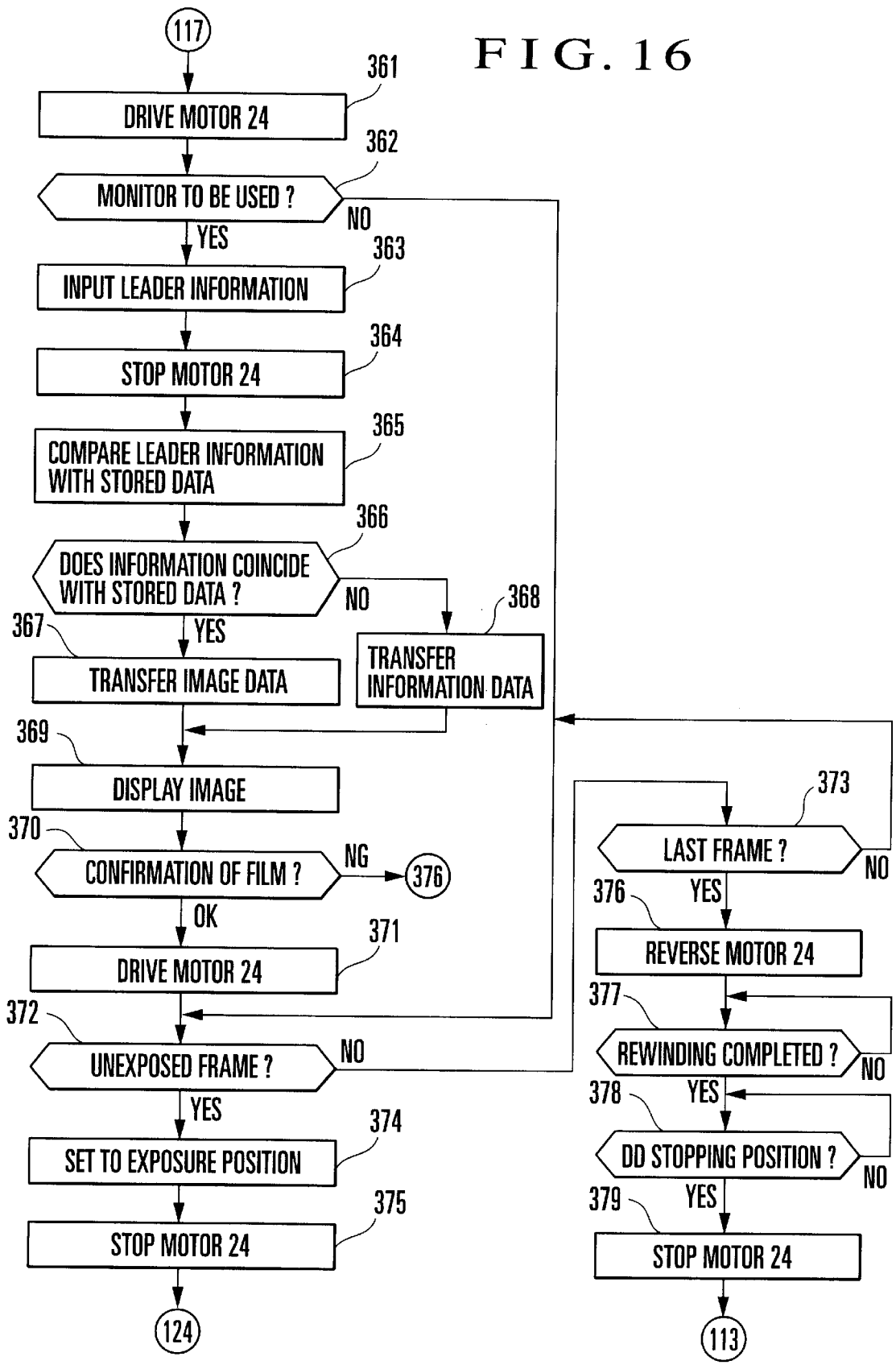
FIG. 16 is a flow chart also showing in part a sequence of actions of essential parts of the camera according to the third embodiment of the invention.
Figure 17:
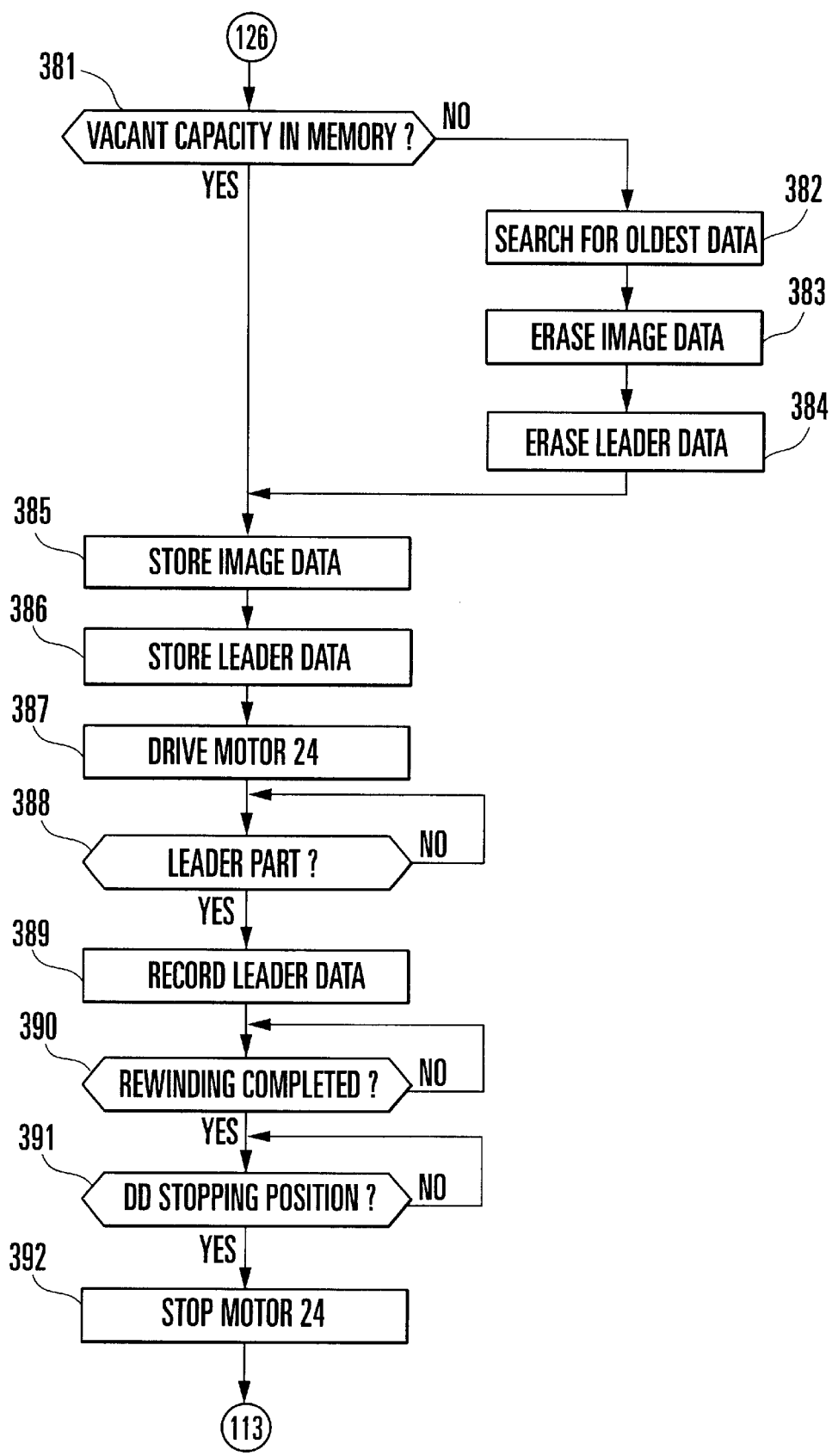
FIG. 17 is a flow chart also showing in part a sequence of actions of essential parts of the camera according to the third embodiment of the invention.

Of the flow charts defining steps of procedures to be executed by the control circuit 41, the procedures of flow charts of FIGS. 7 and 8 are executed by the third embodiment in the same manner as described above. In the third embodiment, however, the control circuit 41 is arranged to execute steps of a flow chart of FIG. 15 in place of the flow chart of FIG. 9, step of a flow chart of FIG. 16 in place of the flow chart of FIG. 10, and steps of a flow chart of FIG. 17 in place of the flow chart of FIG. 11. Therefore, for the third embodiment, the flow charts of FIGS. 15, 16 and 17 are described as follows.

Figure 15:
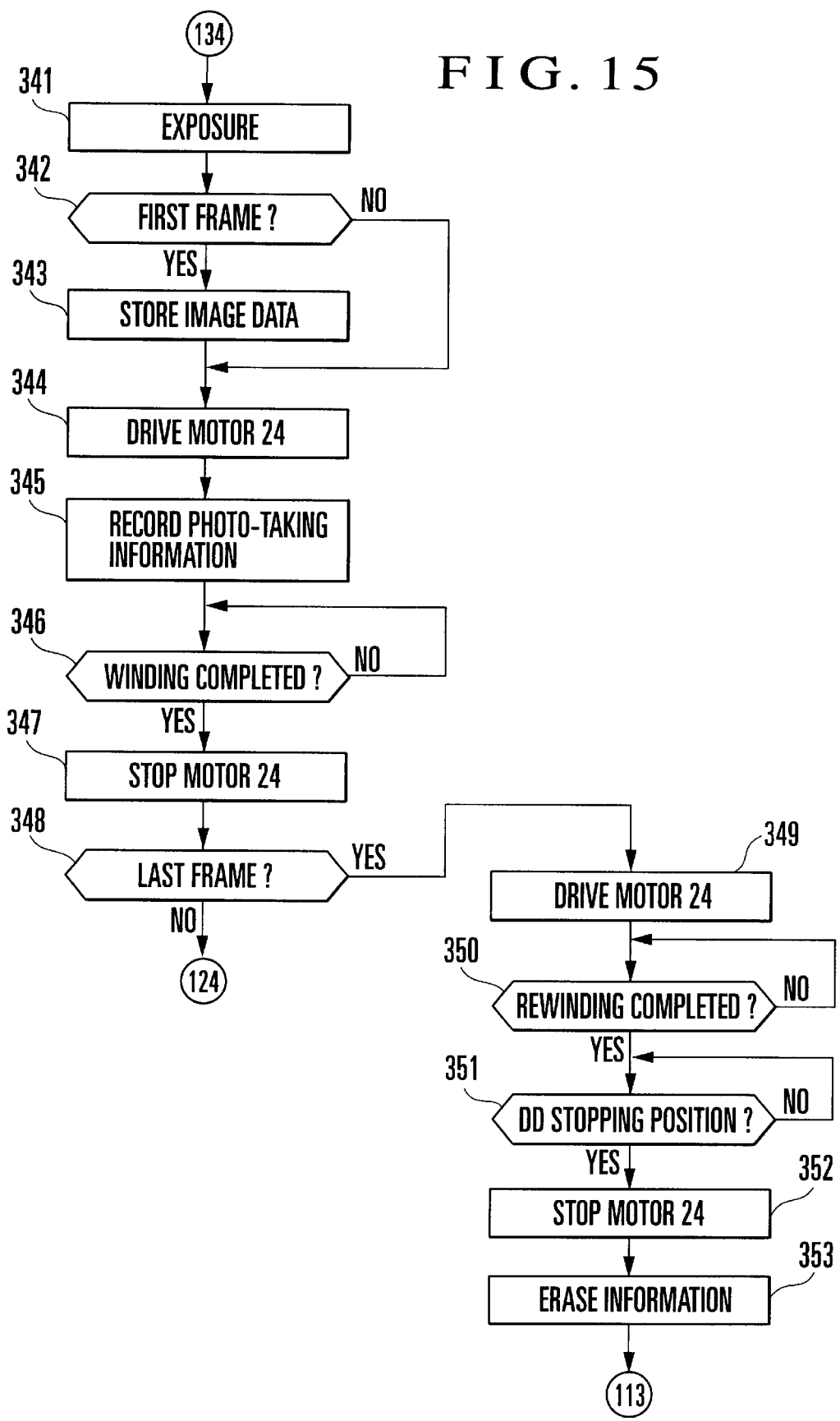
FIG. 15 is a flow chart showing in part a sequence of actions of essential parts of the camera according to a third embodiment of the invention.

In a case where the switch SW2 is found to be in an on-state at the step 134 of FIG. 8, the flow of operation proceeds to a step 341 of FIG. 15.

At the step 341, the shutter 45 is controlled according to an exposure value decided at the step 133 described in the foregoing. If use of the flash device 56 has been decided, a control signal is sent out to cause the flash device 56 to emit light. An exposure action is thus performed on the film 22. Further, a control signal is sent to the image processing circuit 52 to have the image sensor 51 pick up an image according to the timing of the exposure action on the film irrespective of use or nonuse of the monitor 9. At a step 342, a check is made to find if the film currently in use is at the position of the first photo-taking frame. If so, the flow proceeds to a step 343. At the step 343, electronic image data obtained at the step 341 is transferred to and stored in the external memory 53 as the image data of the film 22. The image data is of a still image which is picked up at substantially the same time when the exposure action is performed on the film 22 at the step 341 and thus approximately coincides with a latent image formed on the film by the exposure.

If the film is found at the step 342 to be not at its first photo-taking frame position, the step 343 is not executed. Therefore, in a case where the same film is further used for photo-taking, the electronic image data obtained at the step 343 is continuously stored in the external memory 53 as the image data of the film.

At a step 344, a control signal is sent to the first motor driving circuit 46 to drive the first motor 24 to rotate forward. This causes the film 22 to begin to be wound. At the next step 345, a signal is sent to the magnetic signal interface circuit 50 to have a recording current flow to the magnetic head 31 for magnetically recording information in the magnetic track 30 on the film 22. At a step 346, the flow waits until the next frame of the film 22 is found through a signal coming from the perforation detector 27 to have been set in the predetermined photo-taking position after completion of recording the photo-taking information. At a step 247, a control signal is sent to the first motor driving circuit 46 to stop the first motor 24.

At a step 348, a check is made to find if photo-taking on the last frame of the film 22 is finished. If not, the flow returns to the step 124 to repeat the steps described in the foregoing. If so, the flow proceeds from the step 348 to a step 349. At the step 349, a control signal is sent to the first motor driving circuit 46 to drive the first motor 24 to rotate backward. The film 22 then begins to be rewound. At the step 350, the flow waits until the film 22 is found, for example, through the signal of the perforation detector 27 to be completely rewound into the film cartridge 21. At a step 351, the flow waits, while reading the signal o f the film information reading circuit 34, until the information indicating disk 33 comes to its predetermined position where it indicates completion of exposure of all frames of the film 22. At a step 352, a control signal is sent to the first motor driving circuit 46 to stop the first motor 24. At a step 353, since the film 22 has been completely exposed, the image data and the photo-taking information data stored in the external memory 53 are erased. After that, the flow proceeds from the step 353 to the steps 113, etc., to wait until the film 22 is taken out from the camera.

If the information on the exposed state of the film 22 is found at the step 117 of FIG. 7 to be not an unexposed state, the film is decided to be in a partially exposed state, and the flow proceeds to a step 361 of FIG. 16.

At the step 361, a control signal is sent to the first motor driving circuit 46 to drive the first motor 24 to rotate forward. The film 22 begins to be moved forward. At a step 362, a check is made to find if the selection switch 10 which is provided for selection of use of the monitor 9 is in its on-state. If so, use of the monitor 9 is decided, and the flow proceeds to a step 363. At the step 363, to obtain identification information recorded in the magnetic track 30 of the leader part of the film 22, a signal is inputted from the magnetic signal interface circuit 50. As regards the identification information, use of a serial number or the like assigned to the film loaded on the camera is most apposite. In some cases, however, the film can be identified by using information on a title assigned to each film.

At a step 364, a control signal is sent to the first motor driving circuit 46 to stop the first motor 24. The film 22 is then put to a pause in a state of being pulled out to an extent near to its leader part. At the next step 365, the input of identification information from the leader part of the film is decoded. The decoded information is collated with the identification information data of each of midway rewound films stored in the external memory 53. At a step 366, a check is made for the result of collation to find if there is any data that coincides with the data of the identification information inputted. If so, the flow proceeds to a step 367. At the step 367, image data which is also stored in the external memory 53 in correlation with the identification information data of the midway rewound film in store is transferred to the image processing circuit 52. After that, the flow proceeds from the step 367 to a step 369. If no coinciding data is found at the step 366, the flow proceeds to a step 368. At the step 368, in place of image data, an identification information signal recorded on the film is converted into a form in which the identification information signal can be displayed on the monitor 9 and is transferred to the image processing circuit 52. After that, the flow proceeds from the step 368 to the step 369.

At the step 369, a control signal is sent to the image processing circuit 52 to have either the image data transferred at the step 367 or the identification information data transferred at the step 368 displayed on the monitor 9. This display enables the user to know the image last taken or the identification information on the film with which the camera is just loaded. At a step 370, a check is made to find if the image or identification information displayed on the monitor 9 is what is intended by the user by receiving an acknowledgement signal input. The input of acknowledgement by the user is received in the same manner as the manner described for the step 270 of the second embodiment. Upon receipt of an input indicating that the film loaded is a film wanted by the user, the flow proceeds to a step 371.

At the step 371, a control signal is sent to the first motor driving circuit 46 to drive the first motor 24 to rotate forward. This causes the film 22 to begin to be moved forward again. At the same time, a reading action on the photo-taking information recorded in the magnetic track 30 on the film 22 is also resumed. At the next step 372, a check is made on the basis of deciding a frame at which photo-taking information is recorded to be an exposed frame and a frame at which no photo-taking information is recorded to be an unexposed frame. Frames are checked one by one in this manner while the film is on the forward movement. If a frame checked is found to be not an unexposed frame, the flow proceeds to a step 373. At the step 373, the same frame is checked to find if this frame is the last frame. If not, the flow returns to the step 372 to make a check to find if the next frame is an unexposed frame.

When an unexposed frame is found, the flow proceeds from the step 372 to a step 374. At the step 374, the flow waits until the unexposed frame is found through the signal of the perforation detector 27 to have been set at a predetermined photo-taking (exposure) position. At a step 375, a control signal is sent to the first motor driving circuit 46 to stop the first motor 24. After the step 375, the flow returns to the step 124 of FIG. 8.

When the last frame of the film 22 is found at the step 373, the flow proceeds from the step 373 to a step 376. At the step 376, a control signal is sent to the first motor driving circuit 46 to drive the first motor 24 to rotate backward. This causes the film 22 to be rewound. At the next step 377, the flow waits until the film 22 is found to have been completely rewound into the film cartridge 21 through, for example, the signal of the perforation detector 27. At a step 378, while reading a signal coming from the film information reading circuit 34, the flow waits until the information indicating disk 33 comes to a predetermined position where it indicates completion of exposure for all frames of the film 22. At a step 379, a control signal is sent to the first motor driving circuit 46 to stop the first motor 24. After that, the flow proceeds to the steps 113, etc., and waits until the film 22 is taken out from the camera.

In a case where the rewinding switch 13 is found at the step 126 of FIG. 8 to be in its on-state, the flow proceeds from the step 126 to a step 381 of FIG. 17.

At the step 381, a check is made to find if the external memory 53 still has a sufficient vacant capacity for storing the image data and photo-taking information data for a midway rewound film. If not, the flow proceeds to a step 382. At the step 382, a search is made for the oldest of identification information data of midway rewound films stored in the external memory 53. In a case where the identification information data is serial numbers of films used for photo-taking, the search is made for the smallest of these numbers. At a step 383, image data corresponding to the oldest identification information data searched out is erased from the external memory 53. At a step 384, the oldest identification information data searched out is erased from the external memory 53.

If the external memory 53 is found at the step 381 to have a sufficient vacant capacity for storing the image data and the photo-taking information data of the midway rewound film, the flow of operation proceeds from the step 381 to a step 385, skipping the steps 382 to 384. At the step 385, the image data which corresponds to the film in use (loaded) and stored at the step 343 is additionally stored in the external memory 53 as image data of the midway rewound film 22 in use. At the next step 386, the identification information data which corresponds to the film 22 in use is additionally stored in the external memory 53 as identification information data of the midway rewound film 22 in use.

Further, in the third embodiment, the image data and the identification information data of the film are stored in the external memory 53 in about the same manner as the storing manner of the first embodiment which is as shown in FIG. 18. In the case of the third embodiment, all parts of FIG. 18 reading "photo-taking information" are replaced with words "identification information".

At a step 387, a control signal is sent to the first motor driving circuit 46 to drive the first motor 24 to rotate backward. This causes the film 22 to begin to be rewound. At a step 388, the flow waits until the film 22 is found, through the signal of the perforation detector 27, etc., to have been rewound to an extent of having its leader part at a writing position where the leader part is in contact with the magnetic head 31. When the leader part of the film 22 comes into contact with the magnetic head 31, the flow proceeds to a step 389. At the step 389, a signal is sent to the magnetic signal interface circuit 50 to have information recorded at the leader part including the identification information. This causes a recording current to flow to the magnetic head 31 to enable the magnetic head 31 to record the information into the magnetic track on the film 22.

At a step 390, after completion of recording the information at the leader part, the flow waits until the film 22 is completely rewound into the film cartridge 21. At the next step 391, while reading a signal outputted from the film information reading circuit 34, the flow waits until the position of the information indicating disk 33 comes to a predetermined stop position where it indicates a partially exposed state. At a step 392, a control signal is sent to the first motor driving circuit 46 to stop the first motor 24. After that, the flow proceeds to the step 113 and steps subsequent thereto and waits until the film 22 is taken out.

As described above, for partially exposed films which are used only midway before complete use, the image data of their last frame and the identification information data of their first frames are stored within the camera, at the steps 343 and 386, as much as the capacity of the external memory 53 permits, before the film is rewound.

In a case where a rewound film is reloaded on the camera, the identification information data recorded on the film is collated with the identification information data stored in the camera at the step 365 as described above with reference to the flow chart of FIG. 16. If the identification information data of the reloaded film is found to coincide with the identification information data stored in the camera, the image data of the first photo-taking frame stored in the camera can be displayed on the monitor 9 at the step 367.

The third embodiment of the invention is arranged and operates as described above.

The advantages of the embodiments disclosed are recapitulated as follows.

In the first embodiment, for one and the same film, the photo-taking information data of the last exposed frame and the image data of the last exposed frame are always stored in the external memory 53 in a correlated state (see FIG. 18).

In a case where the film is reloaded, the photo-taking information data is read by the magnetic head 32 and a leading unexposed frame is set. The photo-taking information data recorded at the last exposed frame which precedes the leading unexposed frame by one frame is collated with photo-taking information data stored in a correlated state in the external memory 53. If any of the stored data is found to coincide with the data read by the magnetic head, the applicable image data in store is displayed by the monitor 9. Therefore, even in a case where there are many partially exposed films, the arrangement enables the user to know, without fail, what pictures have been taken on which of these films.

In the second embodiment, for one and the same film, the photo-taking information data of the first exposed frame and the image data of the last exposed frame are always stored in the external memory 53 in a correlated state (see FIG. 18). In a case where the film is reloaded, the photo-taking information data recorded at the first frame is read by the magnetic head 32. The photo-taking information data thus read is collated with photo-taking information data stored in the external memory 53. If any of the photo-taking data in store is found to coincide with the data read by the magnetic head, image data stored in the state of being correlated to the coinciding photo-taking information data is displayed by the monitor 9. Therefore, even in a case where there are many partially exposed films, the arrangement enables the user to know, without fail, what pictures have been taken on which of these films.

As mentioned above, in a case where there are coinciding photo-taking information data, the image data is displayed. This arrangement enables the user to promptly decide either to take out the film by rewinding it or to set a leading unexposed frame of the film. Compared with an arrangement whereby the same decision is made after setting the leading unexposed frame, the arrangement of each of the embodiments enables the user to more promptly carry out subsequent processes of operation.

In a case where no coinciding data is found, the second embodiment displays the photo-taking information data recorded at the first frame on the monitor 9. Therefore, although it is not as clear as the image data, the display lets the user know a certain amount of contents of information on the film by photo-taking date, hour, minute, etc.

Further, the image data to be displayed when any of photo-taking information data in store is found to coincide with the photo-taking information read by the magnetic head 32 is arranged to be the image data of the last exposed frame. The arrangement of each of the embodiments enables the user to see an image data which is obtained latest for the film, so that the film can be more accurately identified.

In a case where the external memory 53 does not have a sufficient room for storing therein photo-taking information data and image data in a correlated state, the oldest photo-taking information data and image data are erased to secure room for storing the latest photo-taking information data and image data. The arrangement effectively makes it possible to let the user see the image data of a film which is currently reloaded, without necessitating use of a memory of a larger storage capacity.

In the third embodiment, for one and the same film, the identification information data recorded at a leader part of the film and the image data of the last exposed frame are stored in the external memory 53 in a correlated state (see FIG. 18). In a case where the film is reloaded, the identification information data recorded at the leader part is read by the magnetic head 32. The identification information data thus read is collated with identification information data stored in the external memory 53. If any data in store is found to coincide with the data read by the magnetic head, image data stored in the state of being correlated to the coinciding identification information data is displayed by the monitor 9. Even in a case where there are many partially exposed films, this arrangement enables the user to know, without fail, what pictures have been taken on which of these films.

As mentioned above, in a case where there are coinciding identification information data, the image data is displayed. This arrangement enables the user to promptly decide either to take out the film by rewinding it or to set a leading unexposed frame of the film. Compared with an arrangement whereby the same decision is made after setting the leading unexposed frame, the arrangement of the third embodiment enables the user to more promptly carry out subsequent processes of operation.

In a case where no coinciding data is found, the third embodiment displays the identification information data recorded at the leader part of the film on the monitor 9. Although it is not as clear as image data, the display lets the user know a certain amount of contents of information on the film by photo-taking date, hours, minute, etc.

Further, the image data to be displayed when some data in store is found to coincide with the data read by the magnetic head 32 is arranged to be the image data of the last exposed frame. The arrangement enables the user to see image data which is obtained latest for the film, so that the film can be accurately identified.

In a case where the external memory 53 does not have a sufficient room for storing therein identification information data and image data in a correlated state, the image data of the correlation of the oldest identification information data and image data is alone (or together with the identification information) compressed to secure room for storing the latest identification information data and image data. The arrangement effectively makes it possible to let the user see the image data of a film which is currently reloaded, without necessitating use of a memory of a larger storage capacity.

The identification information recorded at the leader part of each film is one of serial numbers (or may be titles or the like) assigned to the films to be used by the camera. No other identification information coincides with the identification information recorded. Therefore, the arrangement for displaying the identification information on the monitor 9 effectively identifies each film.

The invention is not limited to the arrangement of the embodiments disclosed but is intended to cover any modifications and equivalent arrangements so long as they are capable of carrying out the functions defined by the appended claims and disclosed by the foregoing description of preferred embodiments.

In the case of each embodiment disclosed, the invention is applied to a camera. However, the invention is applicable also to optical apparatuses other than cameras, such as a film scanner, etc., other apparatuses, devices adapted for such apparatuses, and component elements forming these apparatuses and devices. In a case where the invention is applied to the film scanner, the image sensor is arranged to function as a means for reading an image from a developed film.

While the invention has been described in the foregoing as applied to cases where the camera is loaded with a partially exposed film, the invention likewise applies to other cases where the camera is loaded with a full exposed film or with a developed film.

According to the foregoing description, the external memory 53 is arranged to store the photo-taking information data and the image data in a correlated state as shown in FIG. 18. However, the invention is not limited to this. The arrangement may be variously changed. For example, the external memory 53 may be arranged to store the image data of a specific frame of a film at the address A+n shown in FIG. 18, at the same time, to have information on the address A+n magnetically recorded on the film, to make collation, when the film is reloaded, to find if the address information is included in data reproduced from the reloaded film, and, if so, to cause the image data stored in correlation to the address to be displayed. That modification gives the same advantageous effect as the arrangement described in the foregoing.

The invention applies also to cases where either the whole or a part of claims or the arrangement of each embodiment disclosed forms one apparatus or is used in combination with some other apparatus or as a component element of an apparatus.

The invention applies to a case where what is defined by the appended claims or the arrangement of each embodiment disclosed forms one apparatus either in its entirety or in a separated manner or forms a component of an apparatus.

In the foregoing description, films are used as recording media. However, image recording media other than films can be used in accordance with the invention.

The invention may be carried out by combining as necessary the embodiments or their technological elements described in the foregoing.

As described in the foregoing, according to the arrangement of each embodiment of the invention disclosed, a photographic film image identifying apparatus and a camera having the same can be arranged to be capable of letting the user know what picture has been taken on which of a plurality of films by displaying electronic images as applicable, even in cases where many exposed or partially exposed films are to be used.

What is claimed is:

1. A camera comprising:

an image pickup device for obtaining an electronic object image;

a storage circuit for storing the electronic object image and a photo taking data when the electronic object image is picked up;

a readout circuit for reading out a photo-taking data recorded in a magnetic recording part of a photographic film loaded in said camera;

an image display device;

a comparator circuit for comparing the photo-taking data read by the readout circuit with the photo-taking data stored in the storage circuit;

a display control circuit for displaying the electronic object image on said image display device when the photo-taking data are brought into coincidence with each other by the comparator circuit; and an optical unit for forming an optical image on said image pickup device and the photographic film.

2. A camera according to claim 1, wherein the photographic film is stored in a film cartridge, and said storage circuit stores an electronic object image corresponding to the object image exposed on the final frame of the photographic film.

3. A camera according to claim 2, wherein said storage circuit stores the electronic object image on the final frame with respect to each film cartridge.

* * * * *

UNITED STATES PATENT AND TRADEMARK OFFICE
CERTIFICATE OF CORRECTION

PATENT NO. : 6,477,332 B1
DATED : November 5, 2002
INVENTOR(S) : Toshifumi Ohsawa It is certified that error appears in the above-identified patent and that said Letters Patent is hereby corrected as shown below:

Column 18,
Line 9, delete "o f" and insert -- of --.

Signed and Sealed this

First Day of July, 2003

JAMES E. ROGAN
*Director of the United States Patent and Trademark Office*